US012659231B2

(12) United States Patent
Grosse et al.

(10) Patent No.: US 12,659,231 B2
(45) Date of Patent: Jun. 16, 2026

(54) COMMISSIONING DEVICE USING A SHORT-RANGE SIGNAL

(71) Applicant: SIGNIFY HOLDING B.V., Eindhoven (NL)

(72) Inventors: Debora Yoon Grosse, Atlanta, GA (US); Maina Aoita, Atlanta, GA (US); Tyler Brian Morris, Liverpool, NY (US); Parag Sonawane, Pune (IN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/833,021

(22) PCT Filed: Jan. 23, 2023

(86) PCT No.: PCT/EP2023/051557
§ 371 (c)(1),
(2) Date: Jul. 25, 2024

(87) PCT Pub. No.: WO2023/144088
PCT Pub. Date: Aug. 3, 2023

(65) Prior Publication Data
US 2025/0168070 A1      May 22, 2025

Related U.S. Application Data

(60) Provisional application No. 63/303,686, filed on Jan. 27, 2022.

(30) Foreign Application Priority Data

Feb. 4, 2022      (EP) ..................................... 22155106

(51) Int. Cl.
H05B 47/175          (2020.01)
H04L 41/0893        (2022.01)
(Continued)

(52) U.S. Cl.
CPC ........... *H04L 41/0893* (2013.01); *H04W 4/80* (2018.02); *H05B 47/19* (2020.01); *H05B 47/199* (2024.01); *H05B 47/196* (2024.01)

(58) Field of Classification Search
CPC ...... H04L 41/0893; H04L 12/12; H04W 4/80; H04W 4/33; H05B 47/19; H05B 47/199; H05B 47/196
See application file for complete search history.

(56) References Cited

U.S. PATENT DOCUMENTS

| | | | |
|---|---|---|---|
| 9,374,268 B2 * | 6/2016 | Budde ..................... | H04L 61/50 |
| 2014/0265879 A1 * | 9/2014 | Dillen ................. | H05B 47/115 |
| | | | 315/153 |

(Continued)

FOREIGN PATENT DOCUMENTS

WO            2023144088 A1       8/2023

*Primary Examiner* — Chris Parry
*Assistant Examiner* — Hassan Abdur-Rahman Khan

(57) ABSTRACT

A commissioning device can include a commissioning device controller that is configured to: broadcast, using a first wireless communication technology from a location in a volume of space, a query signal within a broadcast range that covers a portion of a zone of interest within the volume of space; receive a confirmation signal from a local controller using a second wireless communication technology, where the confirmation signal includes an identification of each of a plurality of electrical devices located within the broadcast range that received the query signal, where the plurality of electrical devices is a subset of a totality of electrical devices in a system; determine that one electrical device of the plurality of electrical devices is located in the zone of interest; and send a verification signal to the local controller, where the verification signal includes identifying information about the one electrical device.

14 Claims, 10 Drawing Sheets

(51) Int. Cl.
    *H04W 4/80*        (2018.01)
    *H05B 47/19*      (2020.01)

(56)            References Cited

U.S. PATENT DOCUMENTS

| | | | |
|---|---|---|---|
| 2014/0300276 A1* | 10/2014 | Wang | H04W 4/029 |
| | | | 315/151 |
| 2016/0374133 A1* | 12/2016 | Logue | H04W 76/14 |
| 2020/0084863 A1* | 3/2020 | Taylor | H04L 67/535 |
| 2020/0244785 A1* | 7/2020 | Bora | H04L 69/40 |
| 2020/0255142 A1* | 8/2020 | Whitten | G06Q 10/08 |
| 2020/0288558 A1* | 9/2020 | Anderson | H05B 45/10 |
| 2022/0046707 A1* | 2/2022 | Sanders | H04W 74/04 |

\* cited by examiner

190 ⟍

318 ⟋

600

COMMISSIONING DEVICE USING A SHORT-RANGE SIGNAL

CROSS-REFERENCE TO PRIOR APPLICATIONS

This application is the U.S. National Phase application under 35 U.S.C. § 371 of International Application No. PCT/EP2023/051557, filed on Jan. 23, 2023, which claims the benefit of U.S. Application No. 63,303,686, filed Jan. 27, 2022, and European Patent Application No. 22155106.2, filed on Feb. 4, 2022. These applications are hereby incorporated by reference herein.

TECHNICAL FIELD

The present disclosure relates generally to commissioning devices in a room or other volume of space, and more particularly to systems, methods, and devices for a commissioning device using short-range signals to complete the commissioning process.

BACKGROUND

Commissioning of electrical devices (e.g., luminaires) within a volume of space (e.g., a room, an office complex) is a time-consuming but necessary process that must be completed before the electrical devices are put into service. Part of the commissioning process involves actuating the electrical devices, associating the electrical devices with a controller, and associating the logical representation of each electrical device with its physical identity in a database of the controller. In a large system with multiple controllers, a frequent problem that occurs during the commissioning process is that an electrical device is assigned to the wrong controller.

SUMMARY

In general, in one aspect, the disclosure relates to a commissioning device. The commissioning device can include a commissioning device controller having a transmitter and a receiver. The commissioning device controller can be configured to broadcast, by the transmitter using a first wireless communication technology from a location in a volume of space, a query signal within a broadcast range that covers a portion of a zone of interest within the volume of space. The commissioning device controller can also be configured to receive, by the receiver using a second wireless communication technology, a confirmation signal from a local controller, where the confirmation signal comprises an identification of each of a plurality of electrical devices located within the broadcast range that received the query signal, and where the plurality of electrical devices is a subset of a totality of electrical devices in a system. The commissioning device controller can further be configured to determine that one electrical device of the plurality of electrical devices is located in the zone of interest in the volume of space. The commissioning device controller can also be configured to send, using the transmitter, a verification signal to the local controller, where the verification signal includes identifying information about the one electrical device of the plurality of electrical devices.

In another aspect, the disclosure can generally relate to a method for commissioning a plurality of electrical devices. The method can include broadcasting, using a first wireless communication technology by a transmitter from a location in a volume of space, a query signal within a first broadcast range, where the first broadcast range covers a portion of a zone of interest within the volume of space. The method can also include receiving, using a second wireless communication technology by a receiver, a confirmation signal from a local controller, where the confirmation signal includes an identification of each of a plurality of electrical devices located within the broadcast range that received the query signal, and where the plurality of electrical devices is a subset of a totality of electrical devices in a system. The method can further include determining that one electrical device of the plurality of electrical devices is located in the zone of interest in the volume of space. The method can also include sending, using the transmitter, a verification signal to the local controller, where the verification signal includes identifying information about the one electrical device of the plurality of electrical devices.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1:
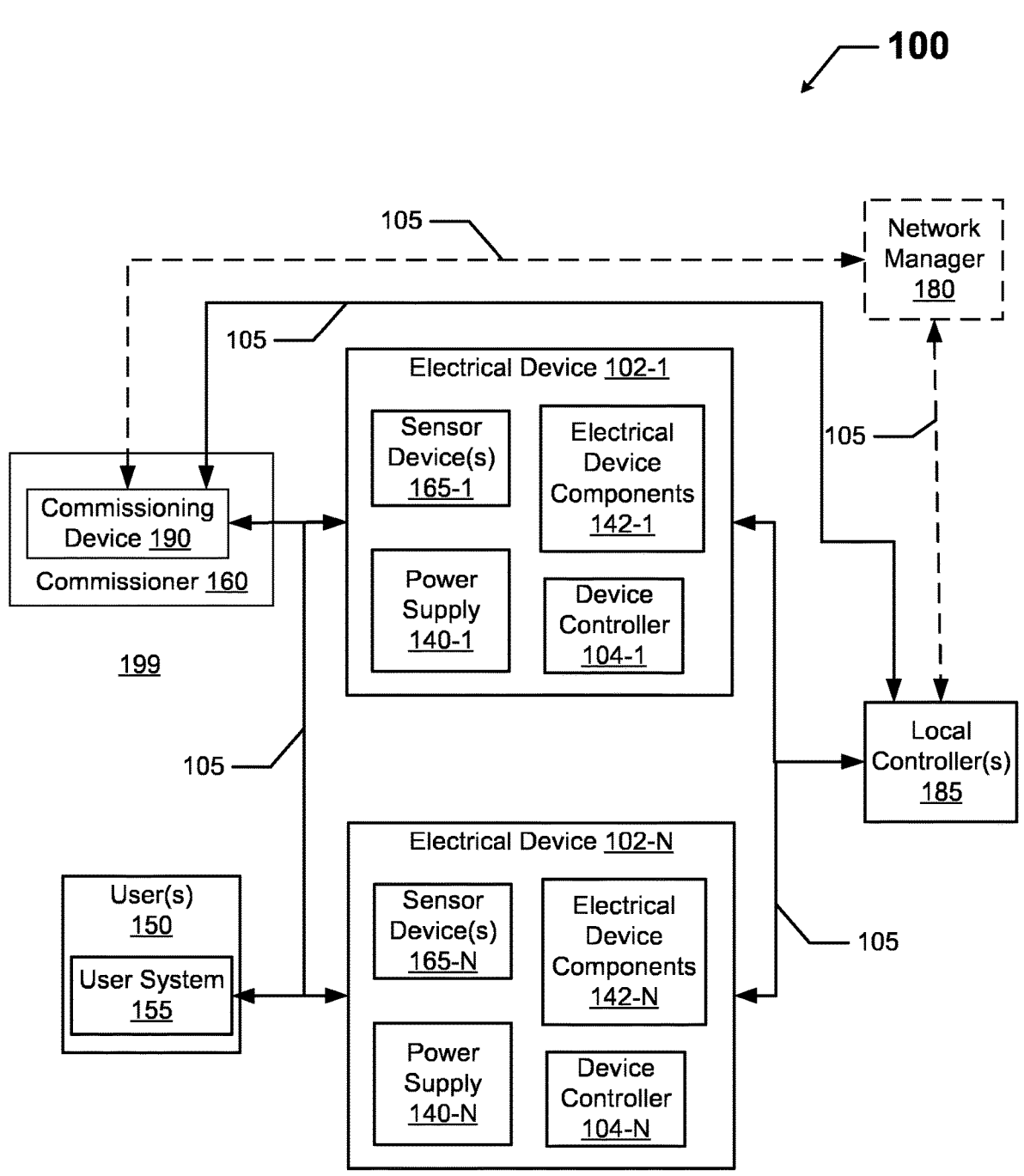
FIG. 1 shows a diagram of a system that includes multiple electrical devices and a commissioning device in accordance with certain example embodiments.

The example embodiments discussed herein are directed to systems, methods, and devices for commissioning devices using short-range signals. As defined herein, short-range signals have a limited broadcast range. Short-range signals can be transmitted using wireless technologies such as Bluetooth Low Energy (BLE). In some cases, the broadcast range of these technologies can be adjustable, but the maximum broadcast range would still enable communication within a minority of a zone of interest in a volume of space.

In the foregoing figures showing example embodiments of commissioning devices, one or more of the components shown may be omitted, repeated, and/or substituted. Accordingly, example embodiments of commissioning devices should not be considered limited to the specific arrangements of components shown in any of the figures. For example, features shown in one or more figures or described with respect to one embodiment can be applied to another embodiment associated with a different figure or description.

In certain example embodiments, commissioning and operation of electrical devices in a volume of space are subject to meeting certain standards and/or requirements. For example, the National Electric Code (NEC), the National Electrical Manufacturers Association (NEMA), the International Electrotechnical Commission (IEC), the Federal Communication Commission (FCC), the Illuminating Engineering Society (IES), and the Institute of Electrical and Electronics Engineers (IEEE) set standards as to electrical devices, electrical enclosures, wiring, and electrical connections. Use of example embodiments described herein meet (and/or allow a corresponding device to meet) such standards when required.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number or a four digit number, and corresponding components in other figures have the identical last two digits.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of commissioning devices using short-range signals will be described more fully hereinafter with reference to the accompanying drawings, in which example embodiments of commissioning devices using short-range signals are shown. Commissioning devices using short-range signals may, however, be embodied in many different forms and should not be construed as limited to the example embodiments set forth herein. Rather, these example embodiments are provided so that this disclosure will be thorough and complete, and will fully convey the scope of commissioning devices using short-range signals to those of ordinary skill in the art. Like, but not necessarily the same, elements (also sometimes called components) in the various figures are denoted by like reference numerals for consistency.

Terms such as "first", "second", "primary," "secondary," "above", "below", "inner", "outer", "distal", "proximal", "end", "top", "bottom", "upper", "lower", "side", "left", "right", "front", "rear", and "within", when present, are used merely to distinguish one component (or part of a component or state of a component) from another. Such terms are not meant to denote a preference or a particular orientation, and such terms are not meant to limit embodiments of commissioning devices using short-range signals. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figures 2, 3:
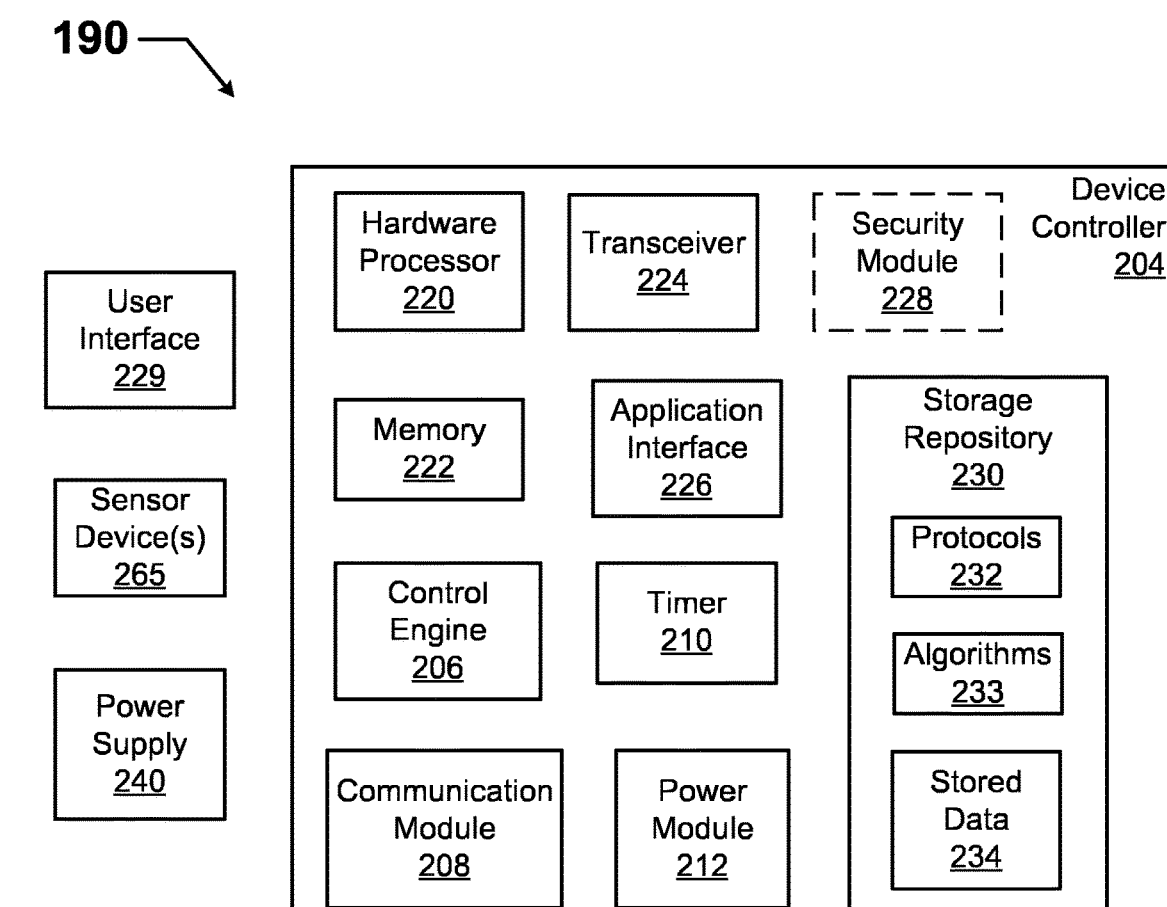
FIG. 2 shows a diagram of the commissioning device of FIG. 1.
FIG. 3 shows a computing system in accordance with certain example embodiments.

FIG. 1 shows a diagram of a system 100 that includes multiple electrical devices 102 and a commissioning device 190 in accordance with certain example embodiments. FIG. 2 shows a diagram of the commissioning device 190 of FIG. 1. Referring to FIGS. 1 and 2, in addition to the electrical devices 102 and the commissioning device 190, the system 100 of FIG. 1 can include one or more users 150 (which can each include one or more user systems 155), a commissioner 160 that is associated with the commissioning device 190, a network manager 180, and one or more local controllers 185. In some cases, there can be multiple commissioners 160, where each commissioner has at least one commissioning device 190.

The commissioning device 190 and at least some of the electrical devices 102 are located in a volume of space 199. The volume of space 199 can be any indoor and/or outdoor area in which multiple electrical devices 102 are located. Examples of a volume of space 199 can include, but are not limited to, an office building, a store, a convention center, a parking lot, a park, an entertainment venue, and a medical facility. When the system 100 includes multiple local controllers 185, there can be multiple zones of interest within the volume of space 199, where electrical devices 102 within a particular zone of interest are controlled by one of the local controllers 185. For example, if a volume of space 199 is a multi-story office building, each floor can be a zone of interest.

The components shown in FIGS. 1 and 2 are not exhaustive, and in some embodiments, one or more of the components shown in FIGS. 1 and 2 may not be included in the system 100 or portions thereof (e.g., an electrical device 102). For example, any component of an electrical device 102 (e.g., electrical device 102-1) can be discrete or combined with one or more other components of the electrical device 102. For instance, each electrical device 102 in the system 100 can have its own device controller 104. Alternatively, one device controller 104 can be used to control multiple electrical devices 102 in the system 100. As another example, the commissioning device 190 can include one or more additional components (e.g., an antenna, a switch) that are now shown in FIG. 2.

An electrical device 102 is any device that uses electricity, at least in part, to operate. The system 100 includes multiple electrical devices 102. In this case, there are N electrical devices 102 (electrical device 102-1 through electrical device 102-N). Each electrical device 102 in the system 100 is commissioned before being put into service. Examples of electrical devices 102 can include, but are not limited to, a luminaire (also called by other names such as a light fixture and a lighting device), a light switch, an automated vent baffle, an automated window covering, a ceiling fan, a projector, a computer, a telephone, a control panel, a thermostat, an electrical wall outlet, a sensor device (e.g., a smoke detector, a $CO_2$ monitor, a motion detector, a broken glass sensor), and a camera.

Each electrical device 102 can include multiple components. For example, in this case, each electrical device 102 includes a device controller 104 (also called an electrical device controller 104 herein), a power supply 140, one or more sensor devices 165, and one or more electrical device components 142. For example, electrical device 102-1 includes a device controller 104-1, a power supply 140-1, one or more sensor devices 165-1, and one or more electrical device components 142-1. As another example, electrical device 102-N includes a device controller 104-N, a power supply 140-N, one or more sensor devices 165-N, and one or more electrical device components 142-N. A device controller 104, a power supply 140, and a sensor device 165 of an electrical device 102 can be substantially the same as the device controller 204, the power supply 240, and the sensor devices 265 of the commissioning device 190, all of which are described in more detail below.

The electrical device components 142 of an electrical device 102 are devices and/or components typically found in the electrical device 102 to allow the electrical device 102 to operate. An electrical device component 142 can be electrical, electronic, mechanical, or any combination thereof. An electrical device 102 can have one or more of any number and/or type of electrical device components 142. For example, when the electrical device 102 is a light fixture, examples of such electrical device components 142 can include, but are not limited to, a light source, a light engine, a heat sink, an electrical conductor or electrical cable, a terminal block, a lens, a diffuser, a reflector, an air moving device, a baffle, a dimmer, an antenna, a switch, and a circuit board.

Each electrical device 102 is configured to be commissioned after the electrical device 102 is installed and before the electrical device 102 is put into operation. As part of the commissioning process, each electrical device 102 is configured to send and receive various communication signals. For example, each electrical device 102 that is located within a communication range of the commissioning device 190 can be configured to receive and interpret the contents of a query signal (a type of communication signal that instructs the electrical device 102 to notify a local controller 185 that the electrical device 102 has received the query signal) broadcast by the commissioning device 190. In response to receiving a query signal, the electrical device 102 can further be configured to generate and send an identification signal (another type of communication signal that notifies a local controller 185 that the electrical device 102 has received the query signal) to a local controller 185 that is within a communication range of the electrical device 102.

A user 150 may be any person that interacts with an electrical device 102, a local controller 185, and/or another component of the system 100. Specifically, a user 150 may program, operate, and/or interface with one or more components (e.g., electrical device 102-1, the network manager 180), or portion (e.g., the device controller 104-1) thereof, associated with the system 100. Examples of a user 150 can include, but are not limited to, an employee, an engineer, an electrician, a technician, an operator, a consultant, a contractor, an asset, and a manufacturer's representative. In some cases, the commissioner 160 can be considered a type of user 150. In such cases, the commissioning device 190 associated with the commissioner 160 can be considered a type of user system 155.

A user 150 can use a user system 155, which may include a display (e.g., a GUI). A user 150 (including an associated user system 155) interacts with (e.g., sends data to, receives data from) the device controller 104 of an electrical device 102 (e.g., electrical device 102-1) via the application interface 226 (described below). A user 150 (including an associated user system 155) can also interact with the network manager 180, the sensor devices 165, the commissioner 160 (including an associated commissioning device 190), and/or one or more local controllers 185. Interaction (including transmission of radio frequency (RF) signals and/or other types of communication signals) between a user 150 (including an associated user system 155), the electrical devices 102, the network manager 180, the sensor devices 165, and the commissioner 160 (including any associated commissioning device 190) can be facilitated using communication links 105.

Each communication link 105 can include one or more wired (e.g., Class 1 electrical cables, Class 2 electrical cables, Power Line Carrier, RS485, DALI, electrical connectors) and/or wireless (e.g., Wi-Fi, visible light communication, cellular networking, Bluetooth, BLE, Zigbee, LoRa, ultra-wideband (UWB), WirelessHART, ISA100) technology. For example, a communication link 105 can be (or include) one or more electrical conductors that are coupled to various components of the system 100. The communication links 105 can transmit signals (e.g., power signals, communication signals (e.g., RF signals), control signals, data) between the electrical devices 102, a user 150 (including an associated user system 155), the sensor devices 165, the sensor devices 265, the commissioner 160 (including an associated commissioning device 190), and/or the network manager 180. For example, the commissioning device 190 can broadcast communication signals to some of the electrical devices 102 of the system 100 at a given time and from a given location within the volume of space 199 using BLE over the communication links 105, as discussed below.

The optional network manager 180 is a device or component that controls all or a portion of the system 100 that includes the local controller 185 and, in some cases, the device controller 104 of at least one of the electrical devices 102 and/or the device controller 204 of the commissioning device 190. The network manager 180 can be substantially similar to the device controller 204 of the commissioning device 190, the device controller 104 of an electrical device 102, and/or a local controller 185. Alternatively, the network manager 180 can include one or more of a number of features in addition to, or altered from, the features of the device controller 204, a device controller 104, and/or a local controller 185. There can be more than one network manager 180 and/or one or more portions of a network manager 180.

In some cases, a network manager 180 can be called by other names, including but not limited to an insight manager, a master controller, a network coordinator, and a network controller. In the embodiment shown in FIG. 1, the network manager 180 receives data from the local controllers 185 and processes this data (e.g., using algorithms (e.g., algorithms 233) and/or protocols (e.g., protocols 232)) to commission the electrical devices 102 in conjunction with the commissioning device 190. The network manager 180 can be located in the volume of space 199 or remotely from the volume of space 199.

Each local controller 185 (sometimes called by other names, including but not limited to wireless access controller and access controller as a generic term and/or when wired communication links 105 are involved) performs a number of different functions. For example, a local controller 185 can help communicate with and control the device controller 104 of one or more electrical devices 102 to help control the operation of those electrical devices 102. For commissioning, the local controller 185 can be responsible for pairing the device controller 104 of an electrical device 102, providing configuration data to the device controller 104 and/or other components of an electrical device 102, synchronizing the timing of the device controller 104 and/or other components of an electrical device 102, supporting the firmware of the device controller 104 and/or other components of an electrical device 102, upgrading the software used by the device controller 104 and/or other components of an electrical device 102, and/or performing any other function with respect to the electrical device 102 (including components thereof) to support commissioning activities.

Each local controller 185 can also be configured to communicate with the commissioning device 190. Such communications between a local controller 185 and the commissioning device 190 can include, for example, a local controller 185 reporting (via a confirmation signal) to the commissioning device 190 the identity of each electrical device 102 that reports receiving a query signal broadcast by the commissioning device 190. As another example, a local controller 185 can receive a confirmation signal from the commissioning device 190 to provide the local controller 185 with identification information about an electrical device 102 being commissioned.

Each local controller 185 can have at least some features and/or components that are similar to the device controller 204 of the commissioning device 190. The controller of a local controller 185 can create and maintain a table that contains information about the electrical devices 102 that are controlled by the local controller 185 after the commissioning process has been completed. Communications between a local controller 185 and the commissioning device 102 can be used to help populate and update these tables. For example, a local controller 185 can receive an ungrouping signal from the commissioning device 190 to instruct the controller of the local controller 185 to remove an electrical device 102 from the table maintained by the local controller 185.

When a local controller 185 receives data (e.g., confirmation of receipt of a RF signal and/or other type of communication signal from the commissioning device 190, packed egress data that arrives as ingress data) from an electrical device 102 or the commissioning device 190, the local controller 185 can convert the data into a different format (e.g., ECAPI). The local controller 185 can then send the newly formatted data to another component (e.g., the network manager 180, the commissioning device 190) of the system 100. To help diagnose issues, a local controller 185 can maintain counters for each paired electrical device 102 and include, for example, the number of received packed data messages from a particular electrical device 102, the number of formatted messages successfully transmitted to the network manager 180 that pertain to the packed data from a particular electrical device 102, and the number of formatted messages pertaining to the packed data from a particular electrical device 102 that failed to transmit to the network manager 180.

In some cases, a local controller 185 maintains the average and maximum latency introduced between the receipt of a communication from one component (e.g., an electrical device 102, the commissioning device 190) of the system 100 and transmission of a formatted message to another component (e.g., the network manager 180) of the system 100. A local controller 185 can also notify the network manager 180 when the average or maximum latency exceeds a threshold value. Further, a local controller 185 can communicate to the network manager 180 when there is a significant discrepancy (e.g., as determined by the local controller 185) between the ingress and egress packets with respect to an electrical device 102 and/or the commissioning device 190.

When there are multiple local controllers 185, they can all be time-synchronized with each other. Also, with multiple local controllers 185, one local controller 185 may or may not be configured to directly communicate with at least one of the other local controllers 185 in the system 100. In some cases, the functionality of a local controller 185 can be the same as, or at least partially combined with, the functionality of the device controller 104 of an electrical device 102 and/or the functionality of the device controller 204 of the commissioning device 190. In other words, some or all of the description below with respect to the local controller 204 of the commissioning device 190 can also apply to a local controller 185 and/or the local controller 104 of an electrical device 102. A local controller 185 can be located in the volume of space 199 or remotely from the volume of space 199.

In certain example embodiments, a local controller 185 can be configured to generate and send a confirmation signal (a form of communication signal) that is sent to the commissioning device 190. As discussed below, a confirmation signal can inform the control engine 206 of the device controller 204 of the commissioning device 190 as to which electrical devices 102, if any, received a query signal broadcast by the device controller 204 of the commissioning device 190. Alternatively, or in addition, a confirmation signal can inform the control engine 206 of the device controller 204 of the commissioning device 190 how many electrical devices 102, if any, received a query signal broadcast by the device controller 204 of the commissioning device 190.

In such cases, a local controller 185 can be configured to receive and interpret identification signals (a form of communication signal) from the electrical devices 102. An identification signal is configured to include information that confirms receipt of a query signal by an electrical device. A local controller 185 can be configured to receive an identification signal from multiple electrical devices 102 at substantially the same time. When this occurs, the local controller 185 can send a single confirmation signal or multiple confirmation signals to the commissioning device 190.

In certain example embodiments, a local controller 185 can be to generate and send testing signals (a form of communication signal) to one or more of the electrical devices 102. A testing signal is configured to include instructions that command the recipient electrical device 102 to operate in a test mode (e.g., flash on and off three times, chirp five times). The particular test mode can be included in a testing signal. Alternatively, the particular test mode can be pre-programmed on the device controller 104 of the electrical device 102. When a testing signal is sent from a local controller 185 to an electrical device 102, the commissioning device 190 can request that the commissioner 160 use the user interface 229 of the commissioning device 190 for visual confirmation as to the operation of the electrical device 102 in the test mode. The response from the commissioning device 190 to the local controller 185 can be part of a verification signal (discussed below).

In certain example embodiments, a local controller 185 establishes and maintains at least one table that contains information about electrical devices 102 that are controlled by the local controller 185. The information that is contained in a table can include, but is not limited to, an identification number of each electrical device 102, a type (e.g., recessed light fixture, control panel, a sensor device, a switch) of each electrical device 102, a location of each electrical device 102 in the volume of space 199, and whether each electrical device 102 is located within a zone of interest controlled by the local controller 185.

Some of the information in a table can be provided to a local controller 185 (e.g., by each electrical device 102, by the commissioning device 190, by a user 150, by a user system 155) during an initial phase of the commissioning process. Other information in a table can be provided to a local controller 185 by each electrical device 102 when the local controller 185 receives communication signals such as identification signals. Yet other information in a table can be provided to a local controller 185 by the commissioning device 190 when the local controller 185 receives communication signals such as verification signals and ungrouping signals.

As defined herein, the commissioner 160 can be an individual. Alternatively, the commissioner 160 can be an object that moves within the volume of space 199 autonomously or under the direct control of a person (e.g., a user 150). The commissioner 160 can move on its own, is capable of being moved, or is stationary. When the commissioner 160 is a machine, the commissioning device 190 and the commissioner 160 can be combined into a single component. A system 100 can have one commissioner 160 or multiple commissioners 160 in the volume of space 199.

The commissioning device 190 can include any of a number of components. For example, as shown in FIG. 2, the commissioning device 190 can include a device controller 204 (also called a commissioning device controller 204 herein), one or more sensor devices 265, a user interface 229, and a power supply 240. The device controller 204 can include one or more of a number of components. Such components, can include, but are not limited to, a control engine 206, a communication module 208, a timer 210, a power module 212, a storage repository 230, a hardware processor 220, a memory 222, a transceiver 224, an application interface 226, and, optionally, a security module 228.

The commissioning device 190 can send RF signals and/or other types of communication signals to and/or receive RF signals and/or other types of communication signals from one or more electrical devices 102, the user systems 155, the network manager 180, and/or the local controllers 185 in the system 100. The commissioning device 190 can use one or more of a number of communication protocols in sending communication signals to and/or receiving communication signals from the electrical devices 102, the user systems 155, the network manager 180, and/or the local controllers 185.

A user 150 (including an associated user system 155), the network manager 180, one or more sensor devices 165, one or more local controllers 185, and/or the device controllers 104 of the electrical devices 102 can interact with the device controller 204 of the commissioning device 190 using the application interface 226 in accordance with one or more example embodiments. Specifically, the application interface 226 of the device controller 204 receives data (e.g., information, communications, instructions) from and sends data (e.g., information, communications, instructions) to a user 150 (including an associated user system 155), the network manager 180, the sensor devices 165, one or more local controllers 185, and/or one or more of the electrical devices 102. A user 150 (including an associated user system 155), the network manager 180, the sensor devices 165, one or more local controllers 185, and/or the device controller 104 of one or more of the electrical devices 102 can include an interface to receive data from and send data to the device controller 204 of the commissioning device 190 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The device controller 204 of the commissioning device 190, a user 150 (including an associated user system 155), the network manager 180, the sensor devices 165, and/or one or more of the local controllers 185, as well as the device controller 104 of one or more of the electrical devices 102, can use their own system or share a system in certain example embodiments. Such a system can be, or contain a form of, an Internet-based or an intranet-based computer system that is capable of communicating with various software. A computer system includes any type of computing device and/or communication device, including but not limited to the device controller 204. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 3.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100. The commissioning device 190 can include a housing. The housing of the commissioning device 190 can include at least one wall that forms a cavity. In some cases, the housing can be designed to comply with any applicable standards so that the commissioning device 190 can be located in a particular environment (e.g., a hazardous environment).

The housing of the commissioning device 190 can be used to house one or more components of the commissioning device 190, including one or more components of the device controller 204. For example, the device controller 204 (which in this case includes the control engine 206, the communication module 208, the timer 210, the power module 212, the storage repository 230, the hardware processor 220, the memory 222, the transceiver 224, the application interface 226, and the optional security module 228), the one or more sensor devices 265, and the power supply 240 can be disposed in the cavity formed by the housing. In alternative embodiments, any one or more of these or other components of the commissioning device 190 can be disposed on the housing, integrated with the housing (e.g., the user interface 229), and/or disposed remotely from the housing.

The storage repository 230 of the device controller 204 can be a persistent storage device (or set of devices) that stores software and data used to assist the device controller 204 in communicating with a user 150 (including an associated user system 155), the network manager 180, the sensor devices 165, the sensor devices 265, one or more local controllers 185, and one or more of the electrical devices 102 within the system 100. In one or more example embodiments, the storage repository 230 stores one or more protocols 232, one or more algorithms 233, and stored data 234.

The protocols 232 can be any procedures (e.g., a series of method steps) and/or other similar operational procedures that the control engine 206 of the device controller 204 follows based on certain conditions at a point in time. A protocol 232 can also include a process for commissioning the electrical devices 102 in the system 100. The protocols 232 can further include any of a number of communication protocols that are used to send and/or receive data between the device controller 204 and a user 150 (including an associated user system 155), the network manager 180, the one or more of the electrical devices 102, the sensor devices 165, and/or one or more local controllers 185.

One or more of the protocols 232 used for communication can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 232 used for communication can provide a layer of security to the data transferred within the system 100.

The algorithms 233 can be any formulas, mathematical models, forecasts, simulations, and/or other similar tools that the control engine 206 of the device controller 204 uses to reach a computational conclusion. An example of one or more algorithms 233 is calculating the strength of a RF (or other type of communication) signal and comparing the strength of a RF signal with a threshold value. Algorithms 233 can be used to analyze past data, analyze current data, and/or perform forecasts. One or more particular algorithms 233 can be used in conjunction with one or more particular protocols 232. For example, one or more protocols 232 and one or more algorithms 233 can be used in conjunction with each other to commission the electrical devices 102 using RF signals sent to and received from the electrical devices 102 and a local controller 185.

Stored data 234 can be any data associated with the electrical devices 102 (including any components thereof), any data associated with the commissioning device 190, any data associated with the local controllers 185, any data associated with the network manager 180, any measurements taken by the sensor devices 165 and/or the sensor devices 265, threshold values, user preferences, results of previously run or calculated algorithms, and/or any other suitable data. Such stored data 234 can be any type of data, including historical data, present data, and forecasts. The stored data 234 can be associated with some measurement of time derived, for example, from the timer 210.

Examples of a storage repository 230 can include, but are not limited to, a database (or a number of databases), a file system, a hard drive, flash memory, cloud-based storage, some other form of solid state data storage, or any suitable combination thereof. The storage repository 230 can be located on multiple physical machines, each storing all or a portion of the protocols 232, the algorithms 233, and/or the stored data 234 according to some example embodiments. Each storage unit or device can be physically located in the same or in a different geographic location.

The storage repository 230 can be operatively connected to the control engine 206. In one or more example embodiments, the control engine 206 includes functionality to communicate with a user 150 (including an associated user system 155), the network manager 180, the sensor devices 165, one or more local controllers 185, and the electrical devices 102 in the system 100. More specifically, the control engine 206 sends information to and/or receives information from the storage repository 230 in order to communicate with a user 150 (including an associated user system 155), the network manager 180, the sensor devices 165, one or more local controllers 185, and the electrical devices 102. As discussed below, the storage repository 230 can also be operatively connected to the communication module 208 in certain example embodiments.

In certain example embodiments, the control engine 206 of the device controller 204 controls the operation of one or more other components (e.g., the communication module 208, the timer 210, the transceiver 224) of the device controller 204. For example, the control engine 206 can put the communication module 208 in "sleep" mode when there are no communications between the device controller 204 and another component (e.g., one of the electrical devices 102, a sensor device 165, a local controller 185, a user system 155) in the system 100 or when communications between the device controller 204 and another component in the system 100 follow a regular pattern. In such a case, power consumed by the device controller 204 is conserved by only enabling the communication module 208 when the communication module 208 is needed.

As another example, the control engine 206 can direct the timer 210 when to provide a current time, to begin tracking a time period, and/or perform another function within the capability of the timer 210. As yet another example, the control engine 206 can direct the transceiver 224 to send RF signals (or other types of communication signals) and/or stop sending RF signals (or other types of communication signals) to one or more of the electrical devices 102, the network manager 180, one or more of the user systems 155, one or more sensor devices 165, and/or one or more local controllers 185 in the system 100. The control engine 206 can also instruct a sensor device 265 to communicate with one or more of the electrical devices 102, the network manager 180, one or more of the user systems 155, with a local controller 185, and/or with the device controller 204. This example provides another instance where the control engine 206 can conserve power used by the device controller 204 and other components (e.g., an electrical device 102, the sensor devices 265) of the system 100.

The control engine 206 can determine when to broadcast one or more communication signals in an attempt to identify, generally locate, and group the electrical devices 102. To conserve energy, the control engine 206 does not constantly broadcast communication signals, but rather only does so at discrete times. The control engine 206 can broadcast a communication signal based on one or more of a number of factors, including but not limited to passage of time, the occurrence of an event, instructions from a user 150 (including an associated user system 155), a confirmation signal received from a local controller 185, and a command received from the network manager 180. The control engine 206 can coordinate with the device controllers 104 of one or more of the electrical devices 102 and/or the local controllers 185 to broadcast multiple communication signals. The control engine 206 can also determine the signal strength (e.g., RSSI value) of one or more of the communication signals that are received from one or more of the electrical devices 102 and/or one or more of the local controllers 185.

The control engine 206 of the device controller 204 can use one or more protocols 232 and/or one or more algorithms 233 to generate and broadcast one or more query signals (a form of communication signal). A query signal (a short-range signal) can be configured to be broadcast within a broadcast range using a communication technology such as BLE. Each query signal is designed to be received by any electrical devices 102 that are within a broadcast range of the query signal. The control engine 206 of the device controller 204 can also use one or more protocols 232 and/or one or more algorithms 233 to determine and/or adjust (e.g., set, increase, decrease, make directional) the broadcast range that is used when broadcasting the query signal. The adjustment of a broadcast range of the communication device 190 can be made by the control engine 206 in response to information (e.g., the number of electrical devices 102 that have acknowledged receiving a query signal (a type of communication signal) from the commissioning device 190) received from a local controller 185.

A query signal can instruct the recipient electrical devices 102 to generate and send an identification signal (another form of communication signal) to one or more local controllers 185. For example, when a device controller 104 of an electrical device 102 receives a query signal broadcast by the commissioning device 190, the device controller 104 of the electrical device 102 can determine that the query signal instructs the device controller 104 to generate and send an identification signal to a local controller 185 to which the electrical device 102 is assigned. The identification signal can include such identifying information (e.g., UUID) of the electrical device and a confirmation that the electrical device 102 received the query signal broadcast by the commissioning device 190.

The control engine 206 of the device controller 204 can also use the protocols 232 and/or the algorithms 233 to receive and interpret a confirmation signal (a form of communication signal) that is received from a local controller 185. A confirmation signal can inform the control engine 206 of the device controller 204 of the commissioning device 190 as to which electrical devices 102, if any, received a query signal broadcast by the device controller 204 of the commissioning device 190. Alternatively, or in addition, a confirmation signal can inform the control engine 206 of the device controller 204 of the commissioning device 190 how many electrical devices 102, if any, received a query signal broadcast by the device controller 204 of the commissioning device 190.

Further, the control engine 206 of the device controller 204 can also use the protocols 232 and/or the algorithms 233 to determine, based on a confirmation signal received from a local controller 185, when only one electrical device 102 has received a query signal broadcast by the device controller 204 of the commissioning device 190. Alternatively, the control engine 206 of the device controller 204 can also use the protocols 232 and/or the algorithms 233 to determine, based on a confirmation signal received from a local controller 185, that multiple electrical devices 102 have received a query signal broadcast by the device controller 204 of the commissioning device 190, but that only one of those electrical devices 102 is located in a zone of interest (discussed below with respect to FIG. 4) within the volume of space 199.

Once the control engine 206 of the device controller 204 determines that only one electrical device 102 has received a query signal broadcast by the device controller 204 of the commissioning device 190, or that only one electrical device 102 out of multiple electrical devices 102 that have received a query signal are in a zone of interest within the volume of space 199, the control engine 206 of the device controller 204 can also use the protocols 232 and/or the algorithms 233, sometimes in conjunction with measurements made by one or more sensor devices 265, to obtain identifying information with respect to the electrical device 102.

Such identifying information can include, but is not limited to, an image of the electrical device 102, a location of the electrical device 102 within the volume of space, and a type of electrical device 102. The identification of an electrical device 102 can be performed in one or more of a number of ways, including but not limited to image processing (e.g., capture, recognition), wireless communication (e.g., Zigbee, Bluetooth, BLE, LoRa), wireless beacons, asset communication, barcode, qr code, datamatrix, IR, NFC, spatial or volumetric analysis of the electrical device 102. The control engine 206 can then send a verification signal (a form of communication signal) to the local controller 185. The verification signal can include the identifying information of the electrical device 102, and the local controller 185 can update at least one of its tables using the identifying information contained in the verification signal.

In some cases, as when the device controller 204 of the commissioning device 190 determines, based on a confirmation signal received from a local controller 185, that multiple electrical devices 102 have received a query signal broadcast by the device controller 204 of the commissioning device 190, but that only one of those electrical devices 102 is located in a zone of interest within the volume of space 199, the control engine 206 of the device controller 204 can also use the protocols 232 and/or the algorithms 233 to send an ungrouping signal (a form of communication signal) that instructs the local controller 185 that sent the confirmation signal to remove the one or more electrical devices 102 that are not in the zone of interest from a table maintained by that local controller 185.

In certain example embodiments, the control engine 206 of the device controller 204 can use the protocols 232 and/or the algorithms 233 to reduce the communication range of a subsequent query signal sent by the device controller 204 when a confirmation signal received from a local controller 185 notifies the device controller 204 that multiple electrical devices 102 located within a zone of interest within the volume of space 199 have received a prior query signal broadcast by the device controller 204. Conversely, the control engine 206 of the device controller 204 can use the protocols 232 and/or the algorithms 233 to increase the communication range of a subsequent query signal sent by the device controller 204 when a confirmation signal received from a local controller 185 notifies the device controller 204 that no electrical devices 102 located within a zone of interest within the volume of space 199 have received a prior query signal broadcast by the device controller 204.

In certain example embodiments, the device controller 204 of the commissioning device 190 can receive communication signals from one or more of the electrical devices 102. In such a case, the control engine 206 of the device controller 204 can use the protocols 232 and/or the algorithms 233 to receive such communication signals and interpret the content of those communication signals. In some cases, the control engine 206 of the device controller 204 can use the protocols 232 and/or the algorithms 233, as well as measurements from one or more sensor devices 265, to determine characteristics (e.g., an angle of arrival (AoA), RSSI value, frequency) of such communication signals.

The control engine 206 can provide control, communication, and/or other similar signals to a user 150 (including an associated user system 155), the network manager 180, the electrical devices 102, the sensor devices 165, and the local controllers 185. Similarly, the control engine 206 can receive control, communication, and/or other similar signals from a user 150 (including an associated user system 155), the network manager 180, the electrical devices 102, the sensor devices 165, and the local controllers 185.

The control engine 206 can communicate with each the electrical devices 102, the network manager 180, and/or one or more of the local controllers 185 automatically (for example, based on one or more algorithms 233 stored in the storage repository 230) and/or based on control, communication, and/or other similar signals received from another device (e.g., a user system 155, a local controller 185) using communication signals. The control engine 206 may include a printed circuit board, upon which the hardware processor 220 and/or one or more discrete components of the device controller 204 are positioned.

In certain embodiments, the control engine 206 of the device controller 204 can communicate with one or more components of a system external to the system 100 in furtherance of commissioning one or more of the electrical devices 102 within the volume of space 199 in the system 100. For example, the control engine 206 can interact with an inventory management system by ordering a replacement part for the commissioning device 190 that the control engine 206 has determined to fail or be failing. As another example, the control engine 206 can interact with a workforce scheduling system by scheduling a maintenance crew to repair or replace the commissioning device 190 (or portion thereof) when the control engine 206 determines that the commissioning device 190 or portion thereof requires maintenance or replacement. In this way, the device controller 204 is capable of performing a number of functions beyond what could reasonably be considered a routine task.

In certain example embodiments, the control engine 206 can include an interface that enables the control engine 206 to communicate with one or more components (e.g., power supply 240) of the commissioning device 190. For example, if the power supply 240 of the commissioning device 190 operates under IEC Standard 62386, then the power supply 240 can include a digital addressable lighting interface (DALI). In such a case, the control engine 206 can also include a DALI to enable communication with the power supply 240 within the commissioning device 190. Such an interface can operate in conjunction with, or independently of, the protocols 232 used to communicate between the device controller 204 and a user 150 (including an associated user system 155), the network manager 180, the electrical devices 102, the sensor devices 165, and the local controllers 185.

The control engine 206 (or other components of the device controller 204) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

The communication network (using the communication links 105) of the system 100 can have any type of network architecture. For example, the communication network of the system 100 can be a mesh network. As another example, the communication network of the system 100 can be a star network. When the device controller 204 includes an energy storage device (e.g., a battery as part of the power module 212), even more power can be conserved in the operation of the system 100. In addition, using time-synchronized communication protocols 232, the data transferred between the device controller 204 and a user 150 (including an associated user system 155), the network manager 180, the sensor devices 165, the local controllers 185, and the electrical devices 102 can be secure.

The communication module 208 of the device controller 204 determines and implements the communication protocol (e.g., from the protocols 232 of the storage repository 230) that is used when the control engine 206 communicates with (e.g., sends signals to, receives signals from) a user 150 (including an associated user system 155), the network manager 180, the electrical devices 102, the sensor devices 165, and/or the local controllers 185. In some cases, the communication module 208 accesses the stored data 234 to determine which communication protocol is within the capability of the electrical devices 102, the user systems 155, the local controllers 185, and/or the network manager 180 for a communication signal sent by the control engine 206. In addition, the communication module 208 can interpret the communication protocol of a communication signal received by the device controller 204 (e.g., from a local controller 185, from an electrical device 102) so that the control engine 206 can interpret the contents of the communication signal.

The communication module 208 can send and receive data between the network manager 180, the sensor devices 165, the sensor devices 265, the electrical devices 102, the local controllers 185, and/or the users 150 (including an associated user system 155) and the device controller 204. The communication module 208 can send and/or receive data in a given format that follows a particular protocol 232. The control engine 206 can interpret the data packet received from the communication module 208 using a protocol 232 stored in the storage repository 230. The control engine 206 can also facilitate the data transfer between one or more sensor devices 265 and the device controller 204, the network manager 180, the electrical devices 102, the local controllers 185, and/or a user 150 (including an associated user system 155) by converting the data into a format understood by the communication module 208.

The communication module 208 can send data (e.g., protocols 232, stored data 234) directly to and/or retrieve data directly from the storage repository 230. Alternatively, the control engine 206 can facilitate the transfer of data between the communication module 208 and the storage repository 230. The communication module 208 can also provide encryption to data that is sent by the device controller 204 and decryption to data that is received by the device controller 204. The communication module 208 can also provide one or more of a number of other services with respect to data sent from and received by the device controller 204. Such services can include, but are not limited to, data packet routing information and procedures to follow in the event of data interruption.

The timer 210 of the device controller 204 can track clock time, intervals of time, an amount of time, and/or any other measure of time. The timer 210 can also count the number of occurrences of an event, whether with or without respect to time. Alternatively, the control engine 206 can perform the counting function. The timer 210 is able to track multiple time measurements concurrently. The timer 210 can be used to help measure one or more characteristics (e.g., the time of flight (ToF) of one or more communication signals (e.g., RF signals), the signal strength (e.g., RSSI value) of a communication signal, the frequency of a communication signal), even simultaneously. The timer 210 can track time periods based on an instruction received from the control engine 206, based on an instruction received from another components (e.g., a user 150 (including an associated user system 155, the network manager 180), based on an instruction programmed in the software for the device controller 204, based on some other condition or from some other component, or from any combination thereof.

The timer 210 can be configured to track time when there is no power delivered to the device controller 204 (e.g., the power module 212 malfunctions) using, for example, a super capacitor or a battery backup. In such a case, when there is a resumption of power delivery to the device controller 204, the timer 210 can communicate any aspect of time to the device controller 204. In such a case, the timer 210 can include one or more of a number of components (e.g., a super capacitor, an integrated circuit) to perform these functions.

The power module 212 of the device controller 204 provides power to one or more other components (e.g., timer 210, control engine 206) of the device controller 204. In addition, in certain example embodiments, the power module 212 can provide power to the power supply 240 of the commissioning device 190. The power module 212 can include one or more of a number of single or multiple discrete components (e.g., transistor, diode, resistor), and/or a microprocessor. The power module 212 may include a printed circuit board, upon which the microprocessor and/or one or more discrete components are positioned. In some cases, the power module 212 can include one or more components that allow the power module 212 to measure one or more elements of power (e.g., voltage, current) that is delivered to and/or sent from the power module 212.

The power module 212 can include one or more components (e.g., a transformer, a diode bridge, an inverter, a converter) that receives power (for example, through an electrical cable) from the power supply 240 and/or a source external to the commissioning device 190. The power module 212 can then subsequently generate power of a type (e.g., alternating current, direct current) and level (e.g., 12V, 24V, 120V) that can be used by the other components of the device controller 204. In addition, or in the alternative, the power module 212 can or include be a source of power in itself to provide signals to the other components of the device controller 204 and/or the power supply 240. For example, the power module 212 can be or include an energy storage device (e.g., a battery). As another example, the power module 212 can be or include a localized photovoltaic power system.

The power module 212 can use a closed control loop to maintain a preconfigured voltage or current with a tight tolerance at the output. The power module 212 can also protect the rest of the electronics (e.g., hardware processor 220, transceiver 224) in the commissioning device 190 from surges generated in the line. The power module 212 can also have sufficient isolation in the associated components of the power module 212 (e.g., transformers, opto-couplers, current and voltage limiting devices) so that the power module 212 is certified to provide power to an intrinsically safe circuit.

In certain example embodiments, the power module 212 of the device controller 204 can also provide power and/or control signals, directly or indirectly, to one or more of the sensor devices 265. In such a case, the control engine 206 can direct the power generated by the power module 212 to the sensor devices 265 and/or the power supply 240 of the commissioning device 190. In this way, power can be conserved by sending power to the sensor devices 265 and/or the power supply 240 of the commissioning device 190 when those devices need power, as determined by the control engine 206.

The hardware processor 220 of the device controller 204 executes software in accordance with one or more example embodiments. Specifically, the hardware processor 220 can execute software on the control engine 206 or any other portion of the device controller 204, as well as software used by a user 150 (including an associated user system 155), the network manager 180, the sensor devices 165, 265, one or more local controllers 185, and/or one or more of the electrical devices 102. The hardware processor 220 can be or include an integrated circuit (IC), a central processing unit, a multi-core processing chip, a multi-chip module including multiple multi-core processing chips, or other hardware processor in one or more example embodiments. The hardware processor 220 can be known by other names, including but not limited to a computer processor, a microprocessor, and a multi-core processor.

In one or more example embodiments, the hardware processor 220 executes software instructions stored in memory 222. The memory 222 includes one or more cache memories, main memory, and/or any other suitable type of memory. The memory 222 is discretely located within the device controller 204 relative to the hardware processor 220 according to some example embodiments. In certain configurations, the memory 222 can be integrated with the hardware processor 220.

In certain example embodiments, the device controller 204 does not include a hardware processor 220. In such a case, the device controller 204 can include, as an example, one or more field programmable gate arrays (FPGA), one or more insulated-gate bipolar transistors (IGBTs), and/or one or more ICs. Using FPGAs, IGBTs, ICs, and/or other similar devices known in the art allows the device controller 204 (or portions thereof) to be programmable and function according to certain logic rules and thresholds without the use of a hardware processor 220. Alternatively, FPGAs, IGBTs, ICs, and/or similar devices can be used in conjunction with one or more hardware processors 220.

The transceiver 224 of the device controller 204 can send (using a transmitter) and/or receive (using a receiver) control and/or communication signals, including RF signals. Specifically, the transceiver 224 can be used to transfer data between the device controller 204 and a user 150 (including an associated user system 155), the network manager 180, the electrical devices 102, one or more of the sensor devices 165, 265, and/or one or more local controllers 185. The transceiver 224 can use wired and/or wireless technology. The transceiver 224 can be configured in such a way that the control and/or communication signals sent and/or received by the transceiver 224 can be received and/or sent by another transceiver that is part of a user 150 (including an associated user system 155), the network manager 180, the electrical devices 102, one or more sensor devices 165, 265, and/or the local controllers 185.

When the transceiver 224 uses wireless technology, any type of wireless technology can be used by the transceiver 224 in sending and receiving communication signals (e.g., RF signals). Such wireless technology can include, but is not limited to, Wi-Fi, visible light communication, infrared, cellular networking, 802.15.4 wireless, 5G cellular wireless, Zigbee, BLE, UWB, and Bluetooth. For example, the transceiver 224 can include a Zigbee transmitter, a Zigbee receiver, a BLE receiver, a BLE transmitter, an active IR transmitter, and/or an active IR receiver. The transceiver 224 can use one or more of any number of suitable communication protocols (e.g., ISA100, HART) when sending and/or receiving communication signals, including RF signals. Such communication protocols can be stored in the protocols 232 of the storage repository 230. Further, any transceiver information for a user 150 (including an associated user system 155), the network manager 180, the electrical devices 102, the sensor devices 165, 265, and/or the local controllers 185 can be part of the stored data 234 (or similar areas) of the storage repository 230.

Optionally, in one or more example embodiments, the security module 228 secures interactions between the device controller 204, a user 150 (including an associated user system 155), the network manager 180, the electrical devices 102, the sensor devices 165, 265, and/or the local controllers 185. More specifically, the security module 228 authenticates communication from software based on security keys verifying the identity of the source of the communication. For example, user software may be associated with a security key enabling the software of a user system 155 of a user 150 to interact with the device controller 204 of the commissioning device 190. Further, the security module 228 can restrict receipt of information, requests for information, and/or access to information in some example embodiments.

As mentioned above, aside from the device controller 204 and its components, the commissioning device 190 can include a power supply 240, one or more sensor devices 265, and a user interface 229. The power supply 240 of the commissioning device 190 provides power to one or more other components (e.g., the device controller 204) of the commissioning device 190. The power supply 240 can be substantially the same as, or different than, the power module 212 of the device controller 204. The power supply 240 can include one or more of a number of single or multiple discrete components (e.g., transistor, diode, resistor), and/or a microprocessor. The power supply 240 may include a printed circuit board, upon which the microprocessor and/or one or more discrete components are positioned.

The power supply 240 can include one or more components (e.g., a transformer, a diode bridge, an inverter, a converter) that receives power (for example, through an electrical cable) from or sends power to the power module 212 of the device controller 204. The power supply 240 can generate power of a type (e.g., alternating current, direct current) and level (e.g., 12V, 24V, 120V) that can be used by the recipients (e.g., the sensor devices 265, the device controller 204) of such power. In addition, or in the alternative, the power supply 240 can receive power from a source external to the commissioning device 190. In addition, or in the alternative, the power supply 240 can be or include a source of power in itself. For example, the power supply 240 can be or include an energy storage device (e.g., a battery), a localized photovoltaic power system, or some other source of independent power.

Each of the one or more sensor devices 265 of the commissioning device 190 can include any type of sensing device that measures one or more parameters. Examples of types of sensor devices 265 can include, but are not limited to, a camera, a passive infrared sensor, a photocell, a pressure sensor, an air flow monitor, a gas detector, and a resistance temperature detector. Examples of a parameter that is measured by a sensor device 265 can include, but are not limited to, characteristics (e.g., AoA, RSSI value) of a communication signal, identification of an electrical device 102, occupancy in the volume of space 199, motion in the volume of space 199, a temperature, a level of gas, a level of humidity, an amount of ambient light in the volume of space 199, and a pressure wave.

In some cases, the parameter or parameters measured by a sensor device 265 can be used to trigger when one or more communication signals are broadcast or otherwise sent by the device controller 204. In addition, or in the alternative, the one or more parameters measured by a sensor device 265 can be used to locate one or more electrical devices 102 in accordance with certain example embodiments. For example, if a sensor device 265 is configured to detect the presence of a communication signal broadcast by an electrical device 102, then the sensor device 265 can forward the communication signal (or portions thereof) to the control engine 206 and/or directly to a local controller 185.

A sensor device 265 can be an integrated sensor (also sometimes called an integrated sensor device 265). In integrated sensor has both the ability to sense and measure at least one parameter and the ability to communicate with another component (e.g., one or more electrical devices 102, a local controller 185). The communication capability of a sensor device 165 that is an integrated sensor can include one or more communication devices that are configured to communicate with, for example, the device controller 204 of the commissioning device 190, an electrical device 102, a local controller 185, a user system 155, and/or the network manager 180. For example, an integrated sensor device 265 can include a camera, a transceiver (a combination transmitter and receiver) that sends and receives communication signals (e.g., with respect to a local controller 185) using Zigbee, and a transmitter that transmits communication signals (e.g., to one or more electrical devices 102) using BLE.

Each sensor device 265, whether integrated or not, can use one or more of a number of communication protocols. This allows a sensor device 265 to communicate with one or more components (e.g., the control engine 206 of the device controller 204, an electrical device 102, a local controller 185, one or more other integrated sensor devices 165) of the system 100. The communication capability of a sensor device 265 that is an integrated sensor can be dedicated to the sensor device 265 and/or shared with the device controller 204 of the commissioning device 190. When the system 100 includes multiple integrated sensor devices 265 (e.g., through multiple commissioning devices 190), one integrated sensor device 265 can communicate, directly or indirectly, with one or more of the other integrated sensor devices 265 in the system 100.

If the communication capability of a sensor device 265 that is an integrated sensor is dedicated to the sensor device 265, then the sensor device 265 can include one or more components (e.g., a transceiver 224, a communication module 208), or portions thereof, that are substantially similar to the corresponding components described above with respect to the device controller 204. A sensor device 265 can be integrated with the commissioning device 190, can be a stand-alone device, and/or can be integrated with another component in the system 100. A sensor device 265 can be located within the housing of the commissioning device 190, disposed on the housing of the commissioning device 190, or located outside the housing of the commissioning device 190.

In certain example embodiments, a sensor device 265 can include an energy storage device (e.g., a battery) that is used to provide power, at least in part, to some or all of the sensor device 265. In such a case, the energy storage device can be the same as, or independent of, an energy storage device or other power supply 240 of the commissioning device 190.

The optional energy storage device of the sensor device 265 can operate at all times or when the power supply 240 of the commissioning device 190 is interrupted. Further, a sensor device 265 can utilize or include one or more components (e.g., memory 222, storage repository 230, transceiver 224) found in the device controller 204. In such a case, the device controller 204 can provide the functionality of these components used by the sensor device 265. Alternatively, the sensor device 265 can include, either on its own or in shared responsibility with the device controller 204, one or more of the components of the device controller 204. In such a case, the sensor device 265 can correspond to a computer system as described below with regard to FIG. 3.

FIG. 3 illustrates one embodiment of a computing device 318 that implements one or more of the various techniques described herein, and which is representative, in whole or in part, of the elements described herein pursuant to certain exemplary embodiments. For example, the device controller 204 of the commissioning device 190 (including components thereof, such as the control engine 206, the hardware processor 220, the storage repository 230, and the transceiver 224) can be considered a computing device 318. Computing device 318 is one example of a computing device and is not intended to suggest any limitation as to scope of use or functionality of the computing device and/or its possible architectures. Neither should computing device 318 be interpreted as having any dependency or requirement relating to any one or combination of components illustrated in the example computing device 318.

Computing device 318 includes one or more processors or processing units 314, one or more memory/storage components 315, one or more input/output (I/O) devices 316, and a bus 317 that allows the various components and devices to communicate with one another. Bus 317 represents one or more of any of several types of bus structures, including a memory bus or memory controller, a peripheral bus, an accelerated graphics port, and a processor or local bus using any of a variety of bus architectures. Bus 317 includes wired and/or wireless buses.

Memory/storage component 315 represents one or more computer storage media. Memory/storage component 315 includes volatile media (such as random access memory (RAM)) and/or nonvolatile media (such as read only memory (ROM), flash memory, optical disks, magnetic disks, and so forth). Memory/storage component 315 includes fixed media (e.g., RAM, ROM, a fixed hard drive, etc.) as well as removable media (e.g., a Flash memory drive, a removable hard drive, an optical disk, and so forth).

One or more I/O devices 316 allow a customer, utility, or other user to enter commands and information to computing device 318, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 318 is connected to a network (not shown) (e.g., a LAN, a WAN such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer device 318 includes at least the minimal processing, input, and/or output means necessary to practice one or more embodiments.

Further, those skilled in the art will appreciate that one or more elements of the aforementioned computer device 318 is located at a remote location and connected to the other elements over a network in certain exemplary embodiments. Further, one or more embodiments is implemented on a distributed system having one or more nodes, where each portion of the implementation (e.g., the control engine 206) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 4:
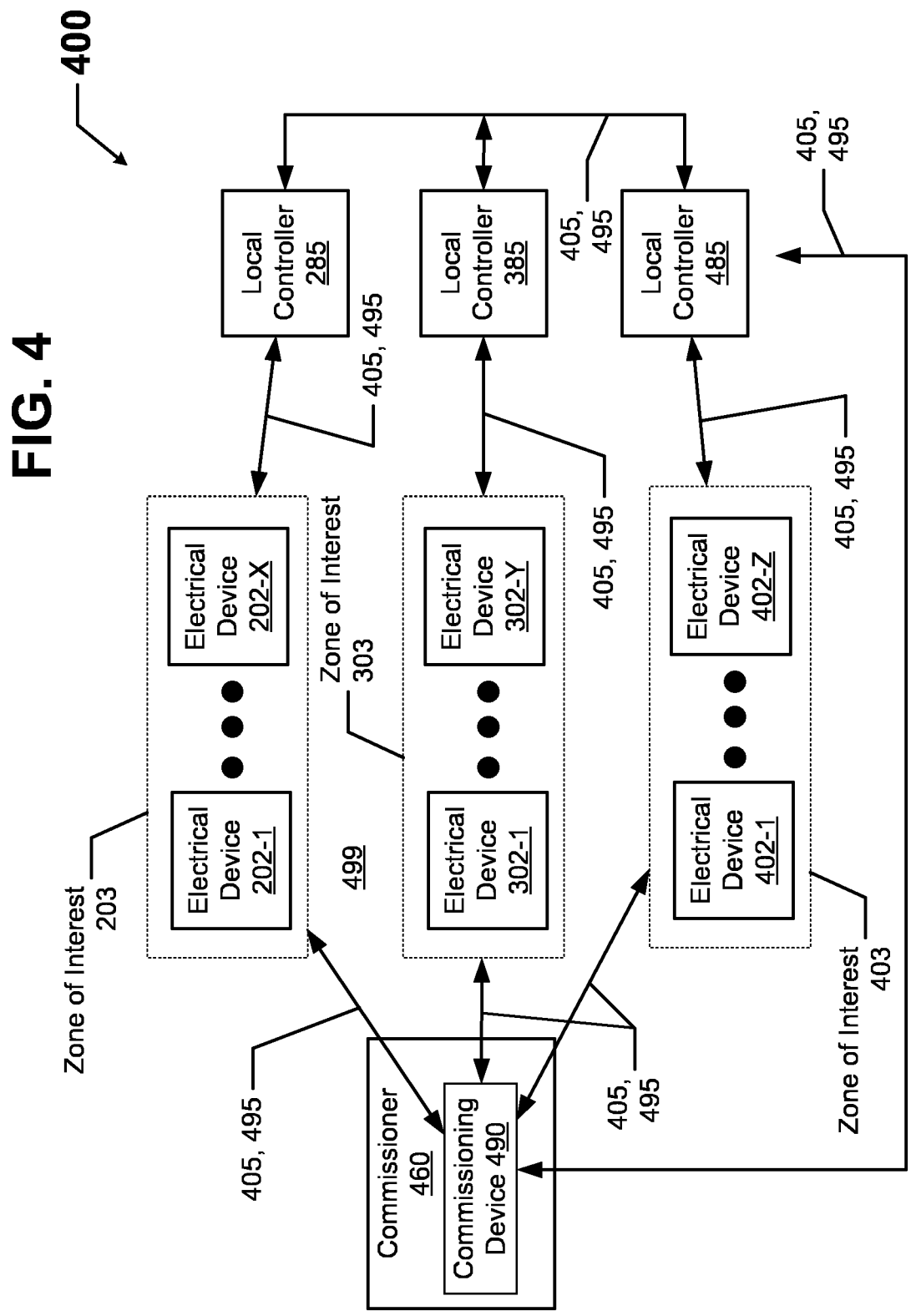
FIG. 4 shows a system that includes a commissioning device located in a volume of space in accordance with certain example embodiments.

FIG. 4 shows a system 400 that includes a commissioning device 490 located in a volume of space 499 in accordance with certain example embodiments. The volume of space 499 can be any interior and/or exterior space in which multiple electrical devices 402 can be located and commissioned. In this case, the volume of space 499 is part of an office space that has three zones of interest (zone of interest 203, zone of interest 303, and zone of interest 403). A zone of interest can be, for example, a different floor in a multi-story office building (as a volume of space 499), a different department in a store (as a volume of space 499), a different office suite in a single floor of a commercial space (as a volume of space 499), or different areas of a theater (as a volume of space 499).

There are multiple electrical devices in each zone of interest. For example, electrical device 202-1 through electrical device 202-X are located in zone of interest 203. Electrical device 302-1 through electrical device 302-Y are located in zone of interest 303. Electrical device 402-1 through electrical device 402-Z are located in zone of interest 403. The electrical devices 202, the electrical devices 302, and the electrical devices 402 of FIG. 4 are substantially the same as the electrical devices 102 discussed above with respect to FIG. 1. Also, the commissioning device 490 of FIG. 4 is substantially the same as the commissioning device 190 of FIGS. 1 and 2 above. Electrical 202-1 through electrical device 202-X, electrical device 302-1 through electrical device 302-Y, and electrical device 402-1 through electrical device 402-Z represent the totality of electrical devices in the system 400.

The system 400 also includes three local controllers (local controller 285, local controller 385, and local controller 485). Local controller 285 controls the electrical devices 202 within the zone of interest 203. Local controller 385 controls the electrical devices 302 within the zone of interest 303. Local controller 485 controls the electrical devices 402 within the zone of interest 403. The local controllers of FIG. 4 are substantially similar to the local controllers 185 discussed above with respect to FIG. 1. When the commissioning process is complete, using example embodiments, each of the totality of electrical devices in the system 400 will be assigned to and controlled by only one of the local controllers (local controller 285, local controller 385, or local controller 485) in the system 400. In this case, there is no network manager (such as network manager 180 of FIG. 1), and so the local controllers in this example coordinate among themselves using the communication links 405.

The various components of the system 400 of FIG. 4 communicate with each other by transmitting communication signals 495 using communication links 405. The communication links 405 of FIG. 4 are substantially the same as the communication links 105 of FIG. 1. In this case, the commissioning device 490 can communicate directly with the electrical devices (electrical device 202-1 through electrical device 202-X, electrical device 302-1 through electrical device 302-Y, and electrical device 402-1 through electrical device 402-Z) and the local controller (local controller 285, local controller 385, and local controller 485). The electrical devices of a zone of interest (zone of interest 203, zone of interest 303, zone of interest 403) can communicate directly with the local controller that controls those electrical devices. Each local controller can communicate directly with each other. The communication signals 495 that are transmitted within the system 400 of FIG. 4 can include, but are not limited to, query signals, confirmation signals, identification signals, ungrouping signals, verification signals, and testing signals.

As the commissioning process is being executed, the example commissioning device 490 can be used to ensure that each electrical device is properly identified by a local controller and that each electrical device is within the proper zone of interest, which means that each electrical device is assigned to the proper local controller controlling that zone of interest. An example of how this part of the commissioning process can be executed using example embodiments is described below with respect to FIG. 5.

Figure 5:
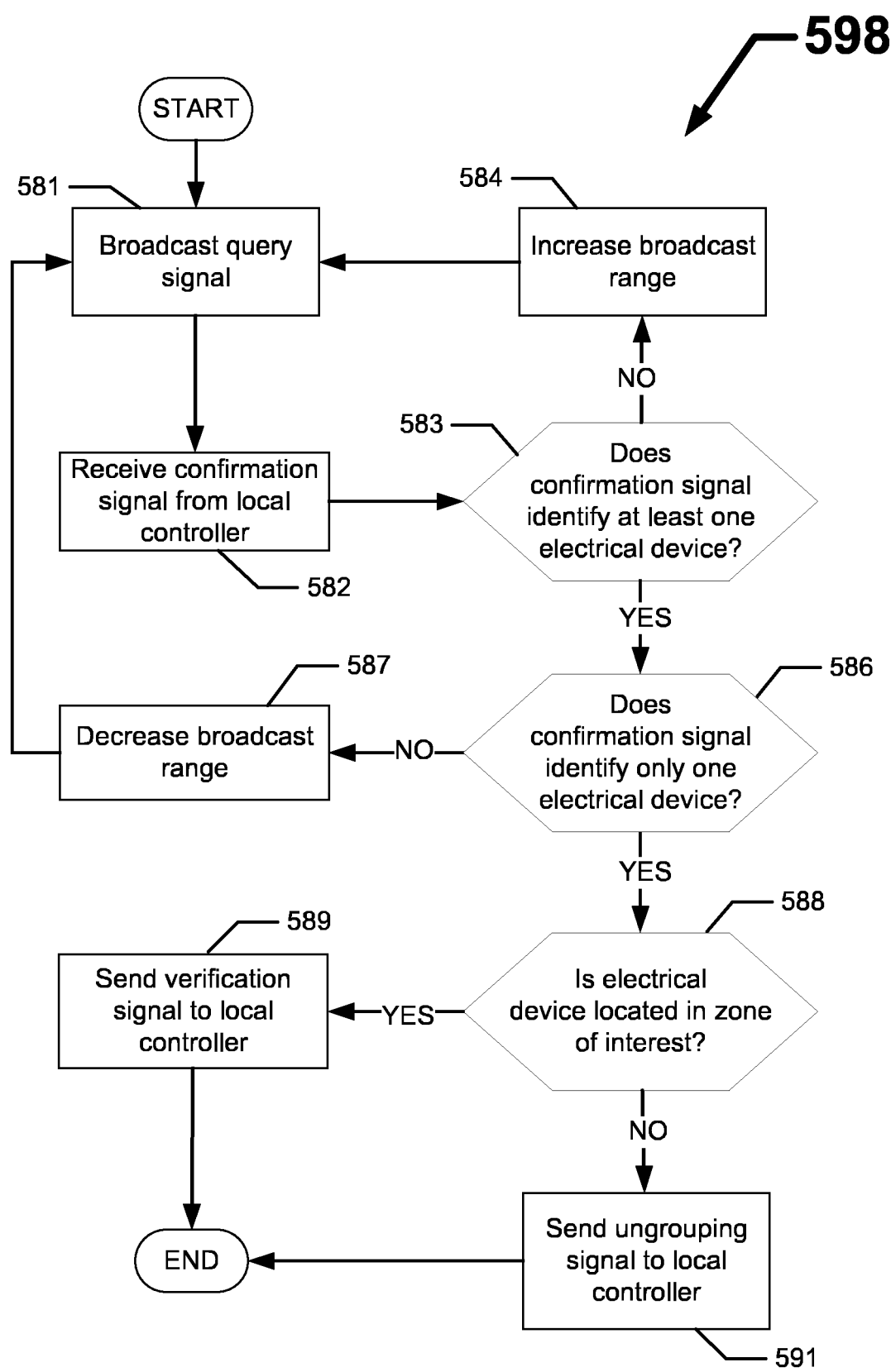
FIG. 5 shows a flowchart of a method for commissioning electrical devices using short-range signals in accordance with certain example embodiments.
Figure 6:
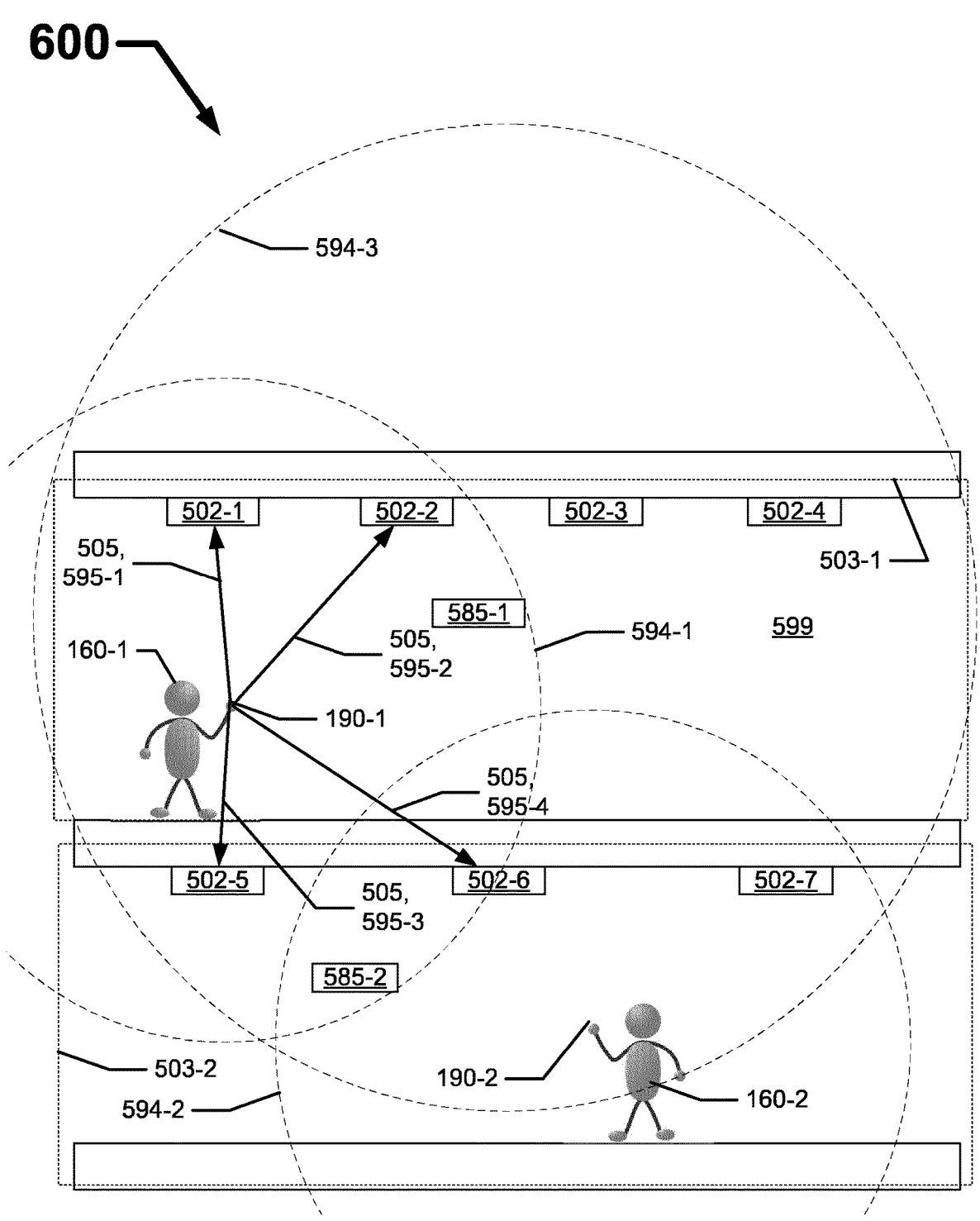
FIGS. 6 through 11 show various stages of an example of commissioning electrical devices using short-range signals following the method of FIG. 5.
Figure 7:
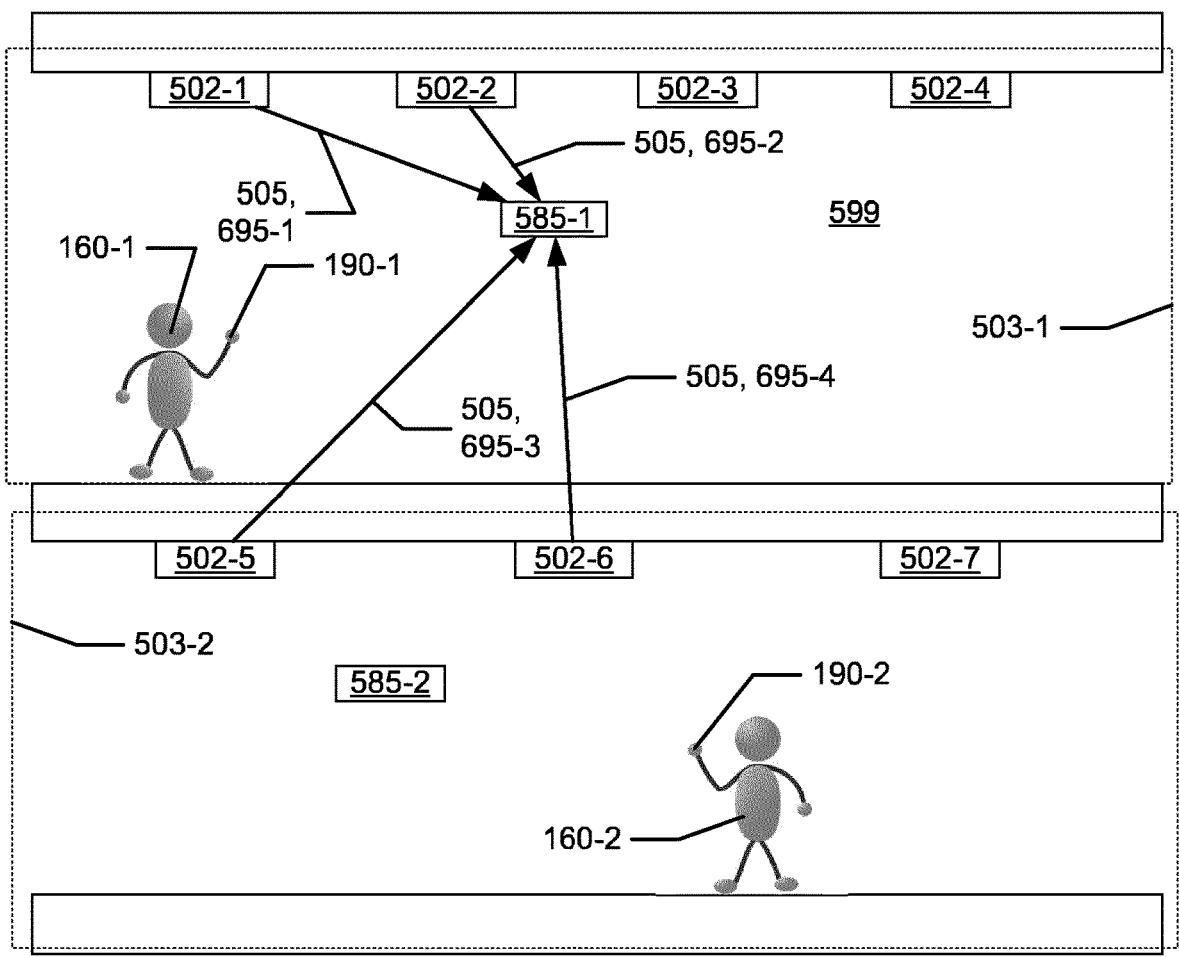
Figure 8:
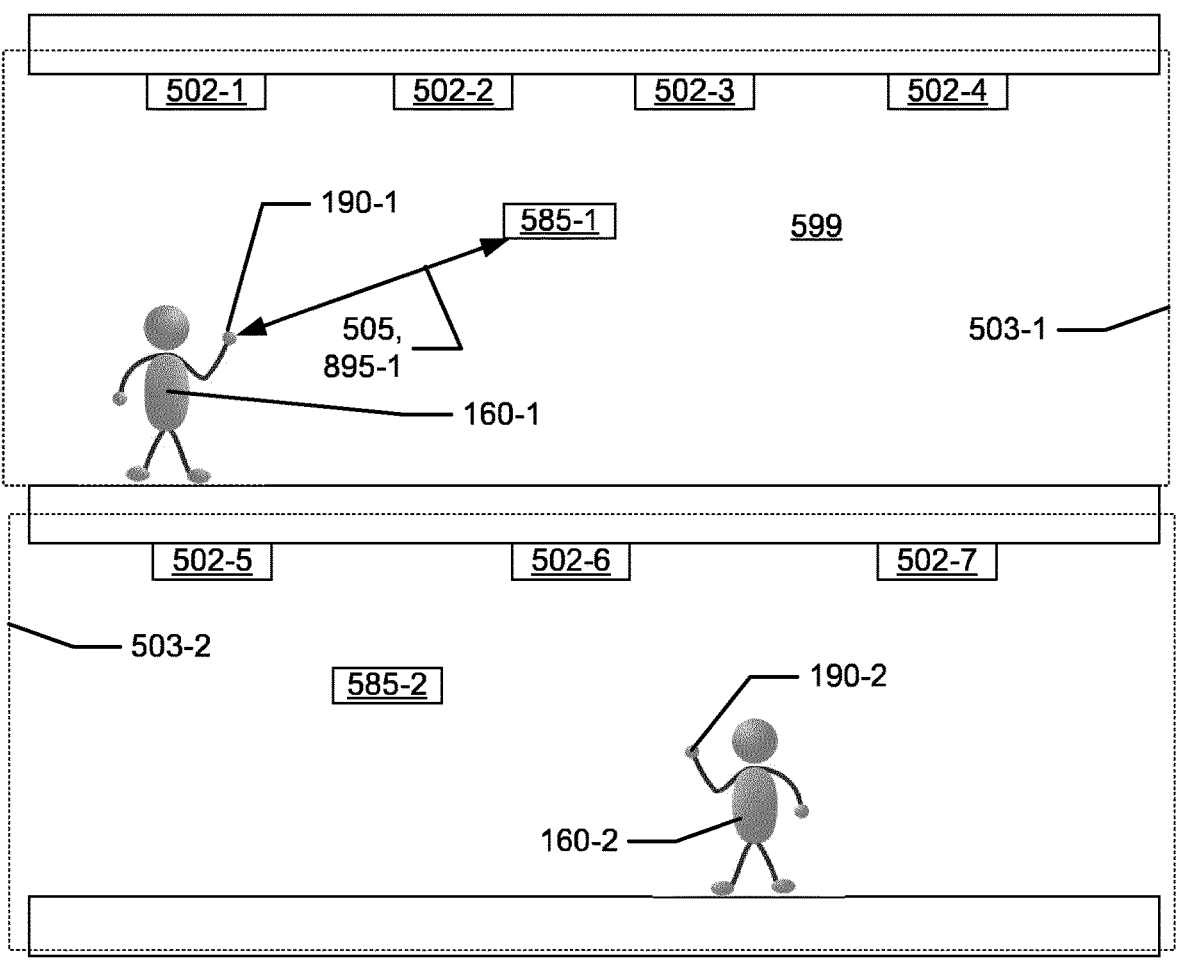
Figure 9:
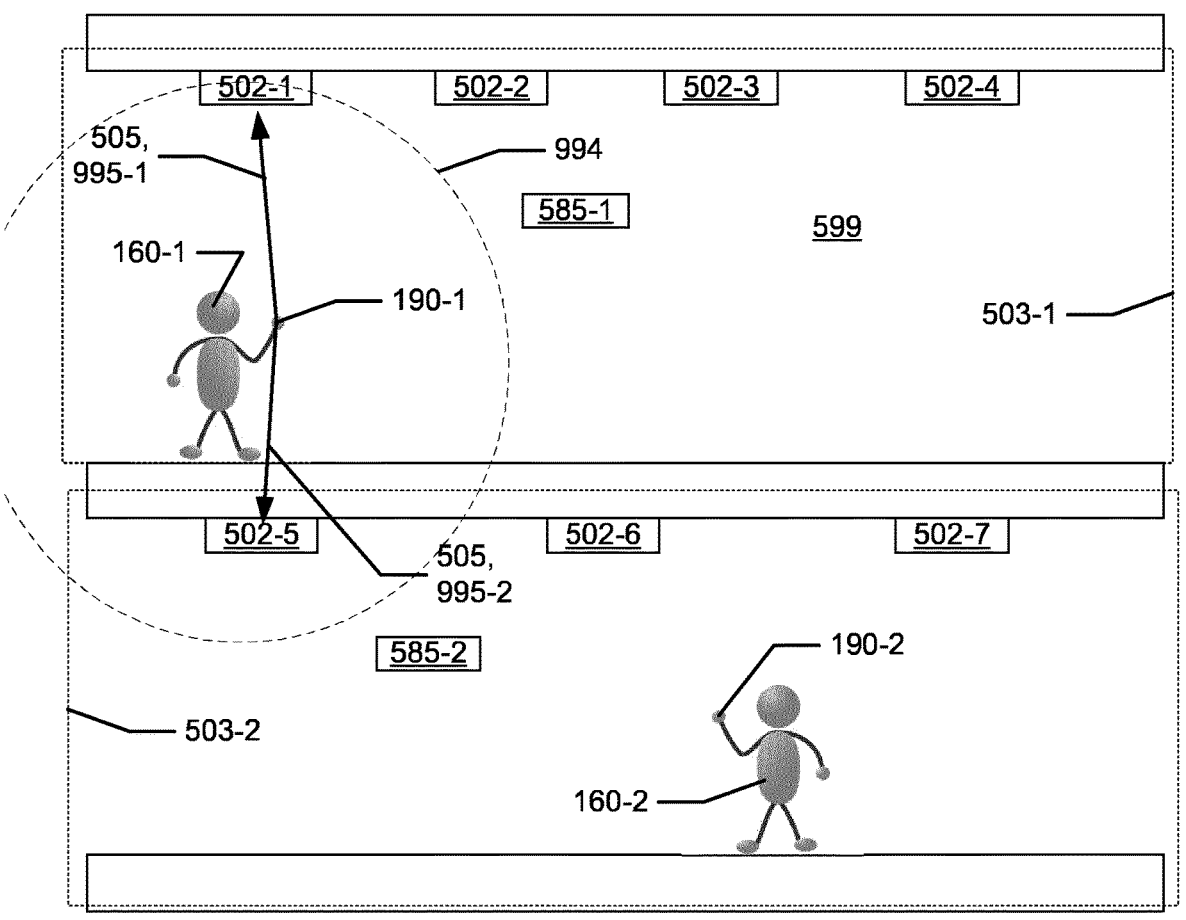
Figure 10:
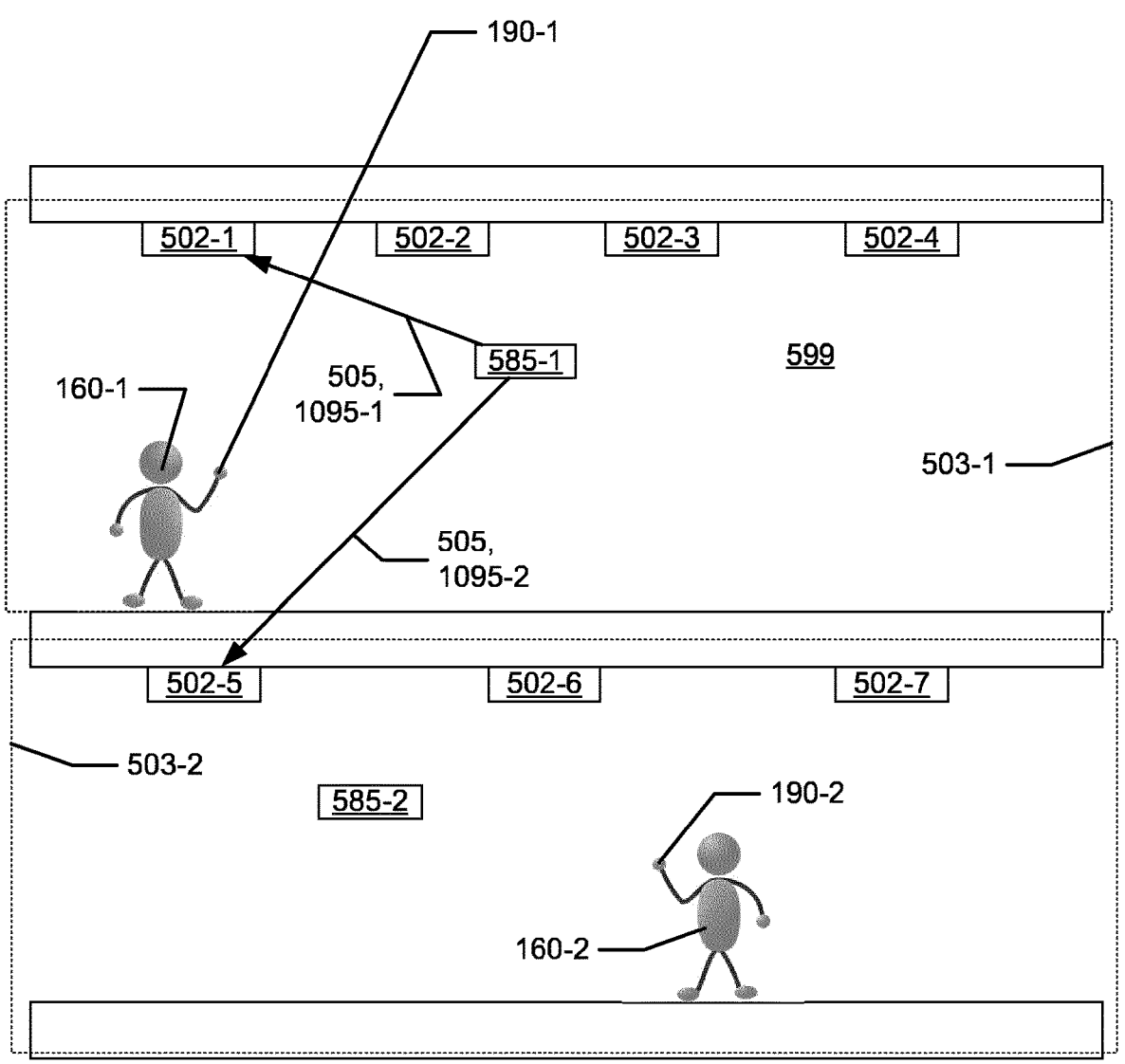
Figure 11:
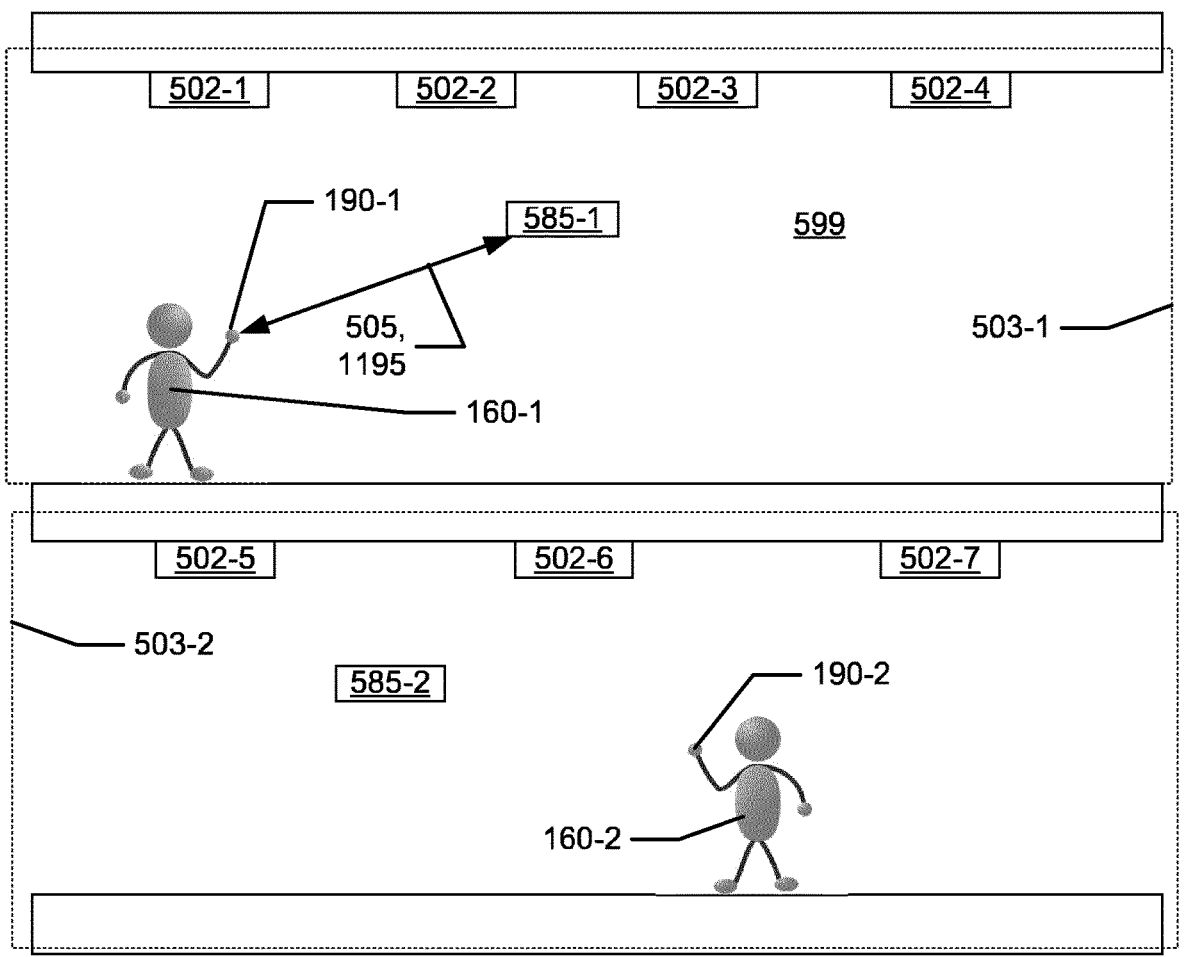

FIG. 5 shows a flowchart of a method 598 for commissioning electrical devices using short-range signals in accordance with certain example embodiments. FIGS. 6 through 11 show various stages of an example of commissioning electrical devices using short-range signals following the method 598 of FIG. 5. Specifically, FIG. 6 shows a point in time coincident with step 581 of the method 598. FIG. 7 shows another point in time between step 581 and step 582 of the method 598. FIG. 8 shows yet another point in time coincident with step 583 of the method 598. FIG. 9 shows still another point in time coincident with step 587 of the method 598. FIG. 10 shows still another point in time coincident with step 588 of the method 598. FIG. 11 shows still another point in time coincident with step 589 or step 591 of the method 598.

While the various steps in this method 598 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 5 may be included in performing this method. Accordingly, the specific arrangement of steps should not be construed as limiting the scope. Further, a particular computing device, such as the computing device discussed above with respect to FIG. 3, can be used to perform one or more of the steps for the methods shown in FIG. 5 in certain example embodiments. Any of the functions performed below by a device controller (e.g., device controller 204) of a commissioning device (e.g., commissioning device 190) can involve the use of one or more protocols (e.g., protocols 232), one or more algorithms (e.g., algorithms 233), and/or stored data (e.g., stored data 234) stored in a storage repository (e.g., storage repository 230).

The method shown in FIG. 5 is merely an example that can be performed by using an example system described herein. In other words, systems for commissioning electrical devices using short-range signals can perform other functions using other methods in addition to and/or aside from those shown in FIG. 5. Referring to FIGS. 1 through 11, the method 598 shown in the flowchart of FIG. 5 begins at the START step and proceeds to step 581, where a query signal is broadcast. The query signal is broadcast by the device controller 204 of a commissioning device 190 (e.g., commissioning device 190-1, commissioning device 190-2) using one or more protocols 232 and/or one or more algorithms 233. The query signal is broadcast using a wireless technology (e.g., BLE) that has a broadcast range that covers only a portion of a zone of interest within the volume of space 599. The query signal is a type of communication signal. The query signal is broadcast into a volume of space 599 in which multiple electrical devices 502 are located and are in the process of being commissioned. The electrical devices 502 of FIGS. 5 through 11 are substantially similar to the electrical devices 102 of FIG. 1 discussed above.

Before getting to step 581, an initial stage of the commissioning process can already be done. This initial stage of the commissioning process can involve the use of a commissioning device 190 (e.g., commissioning device 190-1). Alternatively, the initial stage of the commissioning process can be executed without using a commissioning device 190. This initial stage of the commissioning process involves the electrical devices 502 (in this case, electrical device 502-1, electrical device 502-2, electrical device 502-3, electrical device 502-4, electrical device 502-5, electrical device 502-6, and electrical device 502-7) being powered up for the first time after being installed. In this example, the seven electrical devices 502 represent the totality of the electrical devices to be commissioned in the system 600. Once the commissioning process is completed using example embodiments, each local controller 585 will control a subset of the totality of the electrical devices 502 with no overlap and with every electrical device 502 controlled by a local controller 585.

This initial stage of the commissioning process also involves a number of electrical devices 502 being paired with a local controller 585 (e.g., local controller 585-1, local controller 585-2), in which case the local controller 585 generates and populates a table that includes information about these paired electrical devices 502. For example, as shown in FIG. 6, the local controller 585-1 has a broadcast range 594-3 that encompasses all seven of the electrical devices 502 (electrical device 502-1, electrical device 502-2, electrical device 502-3, electrical device 502-4, electrical device 502-5, electrical device 502-6, and electrical device 502-7). The entire zone of interest 503-1 is within the broadcast range 594-3 of the local controller 585-1. Since the local controller 585-1 typically communicates with the electrical devices 502 using communication signals in the form of RF signals (e.g., using Zigbee), communication between the local controller 585-1 and each electrical device 502 can communicate through ceilings, floor, walls, and other obstacles within the volume of space 599.

As a result, the table established by the local controller 585-1 when the initial stage of the commissioning process is complete includes all seven electrical devices 502, even though electrical device 502-5, electrical device 502-6, and electrical device 502-7 are located in zone of interest 603, which is controlled by local controller 585-2 as opposed to local controller 585-1. In certain example embodiments, each electrical device 502 listed in a table for each local controller 585 at this point in the commissioning process is flagged as "not done", "incomplete", or some other similar designation and remain so until the pairing is confirmed using the method 598. An example of a portion of such a table for local controller 585-1 is shown below.

| Electrical Device | Confirmation Status | Electrical Device Type | Electrical Device Properties |
|---|---|---|---|
| 502-1 | Unconfirmed | Light Fixture | |
| 502-2 | Unconfirmed | Light Fixture | |
| 502-3 | Unconfirmed | Light Fixture | |
| 502-4 | Unconfirmed | Light Fixture | |
| 502-5 | Unconfirmed | Light Fixture | |
| 502-6 | Unconfirmed | Light Fixture | |
| 502-7 | Unconfirmed | Light Fixture | |

Because all seven of the electrical devices 502 are within the communication range 594-3 of the local controller 585-1, they are all listed in the table established and maintained by the local controller 585-1 from the initial stage of the commissioning process. All seven of the electrical devices 502 have an "unconfirmed" status at this time in the table. Also, the table does not have any data (e.g., location data, descriptive data, ID information) in the "Electrical Device Properties" field at this time.

FIG. 6 shows an example of a system 600 at a point in time that coincides with step 581 of the method 598. The system 600 of FIG. 6 includes a volume of space 599 that has two floors, where each floor has its own zone of interest. Specifically, the upper floor shown in FIG. 6 has a zone of interest 503-1, and the lower floor has a zone of interest 503-2. The only electrical devices 502 in this example are ceiling-mounted light fixtures. The upper floor, within the zone of interest 503-1 that is controlled by local controller 585-1, includes electrical device 502-1, electrical device 502-2, electrical device 502-3, and electrical device 502-4. The lower floor, within the zone of interest 503-2 that is controlled by local controller 585-2, includes electrical device 502-5, electrical device 502-6, and electrical device 502-7. While the system 600 does not include a network manager (e.g., network manager 180) or any users (e.g., users 150), including any associated user systems (e.g., user systems 155), the system 600 can include one or more of these components in alternative embodiments.

While this example focuses on local controller 585-1, a similar process can be followed with respect to local controller 585-2, either simultaneously or at different times relative to the method 598 employed with respect to local controller 585-1. As shown in FIG. 6, there is a commissioner 160-1 with a commissioning device 190-1 on the upper floor in the volume of space 599, and there is a commissioner 160-2 with a commissioning device 190-2 on the lower floor in the volume of space 599. Each of the commissioners 160 in FIG. 6, using their respective commissioning devices 190, are participating in the method 598 for the electrical devices 502 that are within the zone of interest 503 of their respective floor for their respective local controller 585.

The commissioning device 190-1 has a communication range 594-1, and the commissioning device 190-2 has a communication range 594-2. The communication range 594-1 covers only a relatively small portion of the zone of interest 503-1, and the communication range 594-2 covers only a relatively small portion of the zone of interest 503-2. Focusing on the commissioning device 190-1, the commissioner 160-1 stands in a stationary location within the zone of interest 503-1 in the volume of space 599 and engages the commissioning device 190-1, which causes the commissioning device 190-1 to broadcast communication signals 595 using the communication links 505. For example, the communication signals 595 can be query signals sent as RF signals using BLE or other short-range signal technology. All of the electrical devices 502 can be equipped with BLE receivers (e.g., part of the controllers of the electrical devices 502).

As a result, electrical device 502-1, electrical device 502-2, electrical device 502-5, and electrical device 502-6 receive the communication signals 595 because they are within the communication range 594-1 of the commissioning device 190-1, while electrical device 502-3, electrical device 502-4, and electrical device 502-7 do not receive the communication signals 595 because they are outside the communication range 594-1 of the commissioning device 190-1. For example, as shown in FIG. 6, electrical device 502-1 receives communication signal 595-1, electrical device 502-2 receives communication signal 595-2, electrical device 502-5 receives communication signal 595-3, and electrical device 502-6 receives communication signal 595-4.

The location within the volume of space 599 at which the commissioning device 190-1 broadcasts the query signal(s) (as the communication signals 595) can be determined by the device controller 204 of the commissioning device 190-1. For example, the device controller 204 can communicate with the local controller 585-1 and/or have access to the table maintained by the local controller 585-1 to determine which electrical devices 502 in the table are unconfirmed at that time. Based on this information, the device controller 204 can suggest where the commissioning device 190-1 should be located when the next query signal is broadcast.

In step 582, at least one confirmation signal is received from a local controller 585. The confirmation signal is received from the local controller 585 by the device controller 204 of a commissioning device 190 (e.g., commissioning device 190-1, commissioning device 190-2) using one or more protocols 232 and/or one or more algorithms 233. The confirmation signal is broadcast into the zone of interest 503-1 within the volume of space 599 using a wireless technology (e.g., Wi-Fi) In certain example embodiments, the wireless technology used to broadcast the confirmation signal differs from the wireless technology used to broadcast the query signal in step 581. The confirmation signal can be a form of communication signal. The confirmation signal can be generated and sent by the local controller 585 in response to the local controller 585 receiving one or more identification signals (another form of communication signal) from one or more of the electrical devices 502.

In certain example embodiments, the confirmation signal only includes electrical devices 502 that have sent an identification signal and that are listed in the table maintained by the local controller 585 as having an unconfirmed status. In other words, an identification signal received by the local controller 585 from an electrical device 502 whose status in the table maintained by the local controller 585 is already confirmed is ignored. Similarly, an identification signal received by the local controller 585 from an electrical device 502 that is not listed in the table maintained by the local controller 585 is ignored. Each of the identification signals can be generated and sent by the electrical devices 502 as a confirmation that the electrical device 502 receipt the query signal broadcast by the commissioning device 190.

For example, turning to FIG. 7, which captures a point in time that corresponds to step 582 of the method 598, the electrical devices 502 that received the communication signals 595 in FIG. 6 (e.g., a few microseconds in the past relative to what is shown in FIG. 7) generate and send communication signals 695 in the form of identification signals to the local controller 585-1 using the communication links 505. The communication signals 695 can be RF signals sent using, for example, Zigbee. As identification signals, the communication signals 695 can include information such as an identification (e.g., UUID) of the sending electrical device 502 and a confirmation that the electrical device 502 received the communication signal 595 broadcast by the commissioning device 190-1.

Specifically, electrical device 502-1 generates and sends a communication signal 695-1 to the local controller 585-1. Electrical device 502-2 generates and sends a communication signal 695-2 to the local controller 585-1. Electrical device 502-5 generates and sends a communication signal 695-5 to the local controller 585-1. Electrical device 502-6 generates and sends a communication signal 695-6 to the local controller 585-1. Once the local controller 585-1 receives all of the communication signals 695, the local controller 585-1 can check the information contained in the communication signals 695 with the table that is maintained by the local controller 585-1. If any information is missing from the table (e.g., an electrical device 502 is not currently listed in the table), the local controller 585-1 can update the table as appropriate based on its own protocols (e.g., similar to the protocols 232).

The local controller 585-1 can also use the information contained in the communication signals 695 to generate and send a communication signal 895 in the form of a confirmation signal to the commissioning device 190-1, as shown in FIG. 8. Step 582 of the method 598 is captured in FIG. 8. The point in time captured in FIG. 8 is subsequent (e.g., by a few microseconds) to the point in time captured in FIG. 7. The communication signal 895 is sent using the communication links 505. The communication signal 895 can be a RF signal sent using, for example, Wi-Fi. The communication signal 895, as a confirmation signal, can include information as to how many (in this example, 4) electrical devices 502 received the query signal (in this example, communication signal 595). The communication signal 895 can also include identification information about those recipient electrical devices 502 (in this example, electrical device 502-1, electrical device 502-2, electrical device 502-5, and electrical device 502-6). The communication signal 895 can also include an identification of the local controller 585-1 as the sender of the communication signal 895.

In some cases, the local controller 585-1 can send a separate communication signal (e.g., communication signal 1095-1 shown in FIG. 10) to an electrical device 502 (e.g., electrical device 502-1) to visually identify itself (e.g., for a light source of the electrical device 502 to blink for 10 seconds). The commissioner 160-1, or the commissioning device 190-1 when one or more sensor devices 265 are used, can confirm which electrical device 502 is blinking by having the commissioning device 190-1 send a communication signal to the local controller 585-1. For example, such a communication signal can instruct the local controller 585-1 to assign the selected electrical device 502 (e.g., electrical device 502-1) the label "Hallway Fixture 3" in the table maintained by the local controller 585-1. Such a communication signal can include other information for the local controller 585-1, such as configuration information of the electrical device 502-1 (e.g., configuring the output of the electrical device 502-1 to be controlled with an occupancy sensor or daylight sensor, setting the color temperature of the electrical device 502-1, setting the maximum light level of the electrical device 502-1).

Returning to the method 598 of FIG. 5, in step 583, a determination is made as to whether the confirmation signal (in this example, communication signal 895) identifies at least one electrical device 502. In other words, a determination is made as to whether any electrical device 502 received the query signal broadcast by the commissioning device 190-1 in step 581. The determination can be made by the device controller 204 of the commissioning device 190-1 using one or more protocols 232 and/or one or more algorithms 233. If the confirmation signal identifies at least one electrical device 502, then the process proceeds to step 586. If the confirmation signal does not identify at least one electrical device 502, then the process proceeds to step 584.

In step 584, the broadcast range 594-1 is increased. The broadcast range 594-1 of the can be increased by the device controller 204 of the commissioning device 190-1. Alternatively, a user 150 can manually increase the broadcast range 594-1 using the user interface 229 of the commissioning device 190-1. As yet another alternative, the broadcast range 594-1 of the commissioning device 190-1 can be increased by another component (e.g., the network manager 180, the local controller 585-1) of the system 600. The extent to which the broadcast range 594-1 is increased can be based on guesswork by the commissioner 160-1, based on an estimate from the device controller 204, the local controller 585-1, or some other component of the system 600, based on an algorithm 233 and/or protocol 232, or based on some other method. Increasing the broadcast range 594-1 of the commissioning device 190-1 increases the likelihood that at least one electrical device 502 will receive the subsequent communication signal (in the form of a query signal) broadcast by the commissioning device 190-1.

As an alternative to increasing the broadcast range 594-1 of the commissioning device 190-1, the commissioning device 190-1 can be moved to a different location within the zone of interest 503-1 in the volume of space 599 while maintaining the broadcast range 594-1. This repositioning of the commissioning device 190-1 within the zone of interest 503-1 can be prompted, for example, by an instruction included in the communication signal 895-1 sent by the local controller 585-1 to the commissioning device 190-1. Alternatively, the device controller 204 of the commissioning device 190-1 can generate an instruction (e.g., using the user interface 229) to the commissioner 160-1 to move to a different location within the zone of interest 503-1. In any case, such an instruction to the commissioner 160-1 can include specific information as to where to move (e.g., two paces East, three feet toward the front door). When step 584 is complete, the process reverts to step 581.

In step 586, a determination is made as to whether the confirmation signal (in this example, communication signal 895) identifies only one electrical device 502. In other words, a determination is made as to whether multiple electrical device 502 received the query signal broadcast by the commissioning device 190-1 in step 581. In some cases, the number of electrical devices 502 that are included in the confirmation signal is compared to a range of acceptable or threshold values. If there are too many electrical devices, then a determination can be made by the device controller 204 to reduce the broadcast range 594-1 and broadcast another query signal in an effort to make the number of electrical devices 502 more manageable. Conversely, step 583 covers the other extreme, where the number (in that case, zero) of electrical devices 502 is too few, and so the broadcast range 594-1 is increased by the device controller 204. The determination can be made by the device controller 204 of the commissioning device 190-1 using one or more protocols 232 and/or one or more algorithms 233. If the confirmation signal identifies only one electrical device 502, then the process proceeds to step 588. If the confirmation signal does not identify only one electrical device 502, then the process proceeds to step 587.

In step 587, the broadcast range 594-1 is decreased. The broadcast range 594-1 of the can be decreased by the device controller 204 of the commissioning device 190-1. Alternatively, a user 150 can manually decrease the broadcast range 594-1 using the user interface 229 of the commissioning device 190-1. As yet another alternative, the broadcast range 594-1 of the commissioning device 190-1 can be decreased by another component (e.g., the network manager 180, the local controller 585-1) of the system 600. The extent to which the broadcast range 594-1 is decreased can be based on guesswork by the commissioner 160-1, based on an estimate from the device controller 204, the local controller 585-1, or some other component of the system 600, based on an algorithm 233 and/or protocol 232, or based on some other method. Decreasing the broadcast range 694-1 of the commissioning device 190-1 is designed to decrease the number of electrical devices 502 that will receive the subsequent communication signal (in the form of a query signal) broadcast by the commissioning device 190-1.

As an alternative to decreasing the broadcast range 594-1 of the commissioning device 190-1, the commissioning device 190-1 can be moved to a different location within the zone of interest 503-1 in the volume of space 599 while maintaining the broadcast range 594-1. This repositioning of the commissioning device 190-1 within the zone of interest 503-1 can be prompted, for example, by an instruction included in the communication signal 895-1 sent by the local controller 585-1 to the commissioning device 190-1. Alternatively, the device controller 204 of the commissioning device 190-1 can generate an instruction (e.g., using the user interface 229) to the commissioner 160-1 to move to a different location within the zone of interest 503-1. In any case, such an instruction to the commissioner 160-1 can include specific information as to where to move (e.g., three paces North, four feet toward the stairwell door). When step 587 is complete, the process reverts to step 581.

As an example, as shown in FIG. 9, the communication range 994 for the commissioning device 190-1 is smaller than the communication range 594-1 shown in FIG. 6. In this case, the communication range 994 is only large enough to encompass electrical device 502-1 and electrical device 502-5, which means that electrical device 502-2 and electrical device 502-6 are outside the communication range 994. When the commissioning device 190-1 sends out subsequent communication signals 995 in the form of query signals, which occurs under a repeat of step 581, electrical device 502-1 receives communication signal 995-1, and electrical device 502-5 receives communication signal 995-2.

In step 588, a determination is made as to whether the electrical device 502 is located in the zone of interest 503-1. The determination can be made by the device controller 204 of the commissioning device 190-1 using one or more sensor devices 265 (e.g., a camera, a photocell), electrical device recognition software, one or more protocols 232, and/or one or more algorithms 233. In addition, or in the alternative, the determination can be made by the commissioner 160-1 interacting with the user interface 229 of the commissioning device 190-1. The determination can be based on a specialized or limited operation of the electrical device 502. For example, when the electrical device 502 is a light fixture, the specialized or limited operation can include flashing the light sources for five seconds. As another example, when the electrical device 502 is a light fixture, the specialized or limited operation can include gradually dimming the light sources over ten seconds from full illumination to no illumination.

The specialized or limited operation of the electrical device 502 can be controlled by the local controller 585-1 in coordination with the commissioning device 190-1. In certain example embodiments, an electrical device 502 is within the zone of interest 503-1 when the commissioner 160-1 and/or the commissioning device 190-1 is within a line of sight of the electrical device 502. For example, as shown in FIG. 10, based on electrical device 502-1 and electrical device 502-5 receiving the query signals 995 broadcast by the commissioning device 190-1 in FIG. 9, the local controller 585-1 can send communication signals 1095 in the form of instruction signals. Specifically, the local controller 585-1 sends a communication signal 1095-1 to electrical device 502-1, instructing the electrical device 502-1 to flash for 10 seconds. Also, the local controller 585-1 sends a communication signal 1095-2 to electrical device 502-5, instructing the electrical device 502-5 to emit red light for 5 seconds.

If the commissioner 160-1 and/or the commissioning device 190-1 can see this test, as is the case with the electrical device 502-1 because they have a line of sight to each other, then the electrical device 502-1 is in the zone of interest 503-1. On the other hand, if the commissioner 160-1 and/or the commissioning device 190-1 cannot see this test, as is the case with the electrical device 502-5 because they are on different floors, then the electrical device 502-5 is not in the zone of interest 503-1. If the electrical device 502 is located in the zone of interest 503-1, then the process proceeds to step 589. If the electrical device 502 is not located in the zone of interest 503-1, then the process proceeds to step 591.

In step 589, a verification signal is sent to the local controller 585-1. The verification signal can be a form of communication signal. For example, referring to FIG. 11, the verification signal can be a form of communication signal 1195 sent from the commissioning device 190-1 to the local controller 585-1. The verification signal can be sent by the device controller 204 of the commissioning device 190-1 using the communication links 505. The verification signal can include information that confirms to the local controller 585-1 that the electrical device 502-1 is within the zone of interest 503-1. The verification signal can also include other information about the electrical device 502-1, such as identifying information (e.g., type of light fixture, location of light fixture). The identifying information can be provided to the device controller 204 of the commissioning device 190-1 by the commissioner 160-1 through the user interface 229 and/or by one or more of the sensor devices 265.

In some cases, the local controller 585-1 can send a reply signal (another form of communication signal 1195) in an attempt to obtain more information from the commissioner 160-1 and/or the commissioning device 190-1. In such a case, in response, the commissioning device 190-1 can send another communication signal 1195 to the local controller 585-1. Upon receiving the verification signal, the local controller 585-1 can update its table accordingly. Further, in some cases, the local controller 585-1 can respond to a verification signal by notifying the network manager (e.g., network manager 180) and/or the other local controllers 585 (in this case, the local controller 585-2) that the electrical device 502 (in this case, electrical device 502-1) is confirmed as being controlled by the local controller 585-1. This can cause the local controller 585-2 to update its table by removing electrical device 502-1 in the event that the table included electrical device 502-1 at that point in time. When step 589 is complete, the process can proceed to the END step. Alternatively, the commissioner 160-1 can move the commissioning device 190-1 to a new location within the zone of interest 503-1 and begin the method 598 again.

In step 591, an ungrouping signal is sent to the local controller 585-1. The ungrouping signal can be a form of communication signal. For example, referring to FIG. 11, the ungrouping signal can be another form of a communication signal 1195. The ungrouping signal can be sent by the device controller 204 of the commissioning device 190-1 using the communication links 505. The ungrouping signal can include information that confirms to the local controller 585-1 that the electrical device 502-5 is outside the zone of interest 503-1. The communication signals 1195 (e.g., verification signals, reply signals, ungrouping signals) can be RF signals. Upon receiving the ungrouping signal, the local controller 585-1 can update its table accordingly.

Further, in some cases, the local controller 585-1 can respond to an ungrouping signal by notifying the network manager (e.g., network manager 180), the ungrouped or unpaired electrical device 502, and/or the other local controllers 585 (in this case, the local controller 585-2) that the electrical device 502 (in this case, electrical device 502-5) is not being controlled by the local controller 585-1. When such a communication signal is sent by the local controller 585-1 to the electrical device 502-5, the electrical device 502-5 can be instructed to unpair itself with the local controller 585-1. When this occurs, the electrical device 502-5 can find another local controller 585 (e.g., local controller 585-2) to pair itself with. When step 591 is complete, the process can proceed to the END step. Alternatively, the commissioner 160-1 can move the commissioning device 190-1 to a new location within the zone of interest 503-1 and begin the method 598 again.

In some cases, step 586 is optional. In such cases, the determination of step 588 can be made for multiple electrical devices 502. When this occurs, one electrical device 502 (e.g., electrical device 502-1) can be tested at a time. When the test of one electrical device 502 is complete, then the commissioning device 190-1 can execute step 589 or step 591, as appropriate, before the next electrical device is tested under step 588. An example of an updated table for the local controller 585-1 based on the information in the communication signals 1195 of steps 589 and 591 is shown below.

| Electrical Device | Confirmation Status | Electrical Device Type | Electrical Device Properties |
|---|---|---|---|
| 502-1 | Confirmed | Light Fixture | Troffer light mounted in ceiling |
| 502-2 | Unconfirmed | Light Fixture | |
| 502-3 | Unconfirmed | Light Fixture | |
| 502-4 | Unconfirmed | Light Fixture | |
| 502-6 | Unconfirmed | Light Fixture | |
| 502-7 | Unconfirmed | Light Fixture | |

In this case, based on the example set forth in FIGS. 6 through 11, the status of the electrical device 502-1 is changed to "confirmed", and a description of the electrical device 502-1, provided using the commissioning device 190-1, is added to the table. Also, all of the information regarding the electrical device 502-5 has been removed from the table. Example embodiments can complete the commissioning of multiple electrical devices in a system having multiple zones of interest by accurately and efficiently assigning subsets of the electrical devices to a proper zone of interest, and so also to a proper local controller to control those electrical devices in the subset. Example embodiments can be executed automatically and/or with input from a commissioner. Example embodiments can save time, save resources, and manage new installations or changes to a system.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A commissioning device for commissioning a plurality of electrical devices, the commissioning device, comprising:
  a commissioning device controller comprising a transmitter and a receiver, wherein the commissioning device controller is configured to:
    broadcast, by the transmitter using a first wireless communication technology from a location in a volume of space, a first query signal within a first broadcast range that covers a portion of a zone of interest within the volume of space;

receive, by the receiver using a second wireless communication technology, a first confirmation signal from a local controller, wherein the first confirmation signal comprises an identification of each of a first plurality of electrical devices located within the first broadcast range that received the first query signal, and wherein the first plurality of electrical devices is a first subset of a totality of electrical devices in a system;

determine more than one electrical devices of the first plurality of electrical devices is located in the zone of interest in the volume of space;

reduce, at the transmitter, the first broadcast range of the first query signal to a second broadcast range and subsequently broadcasting a second query signal with the second broadcast range;

receive, by the receiver using a second wireless communication technology, a second confirmation signal from a local controller, wherein the second confirmation signal comprises an identification of one of the first plurality of electrical devices located within the second broadcast range that received the second query signal, and send, using the transmitter, a verification signal to the local controller, wherein the verification signal comprises identifying information about the one electrical device of the first plurality of electrical devices.

2. The commissioning device of claim 1, further comprising a sensor device communicably coupled to the controller, wherein the sensor device is configured to detect a test of the one electrical device, and wherein detecting the test, as communicated by the sensor device to the controller, confirms that the one electrical device is located in the zone of interest.

3. The commissioning device of claim 1, wherein the commissioning device controller is further configured to:

broadcast, before broadcasting the first query signal, using the first wireless communication technology by the transmitter from the location in the volume of space, a prior query signal within a third broadcast range;

receive, by the receiver using the second wireless communication technology, a prior confirmation signal from the local controller, wherein the prior confirmation signal comprises the identification of each of a second plurality of electrical devices located within the third broadcast range that received the prior query signal, wherein the second plurality of electrical devices is a second subset of a totality of electrical devices in a system, and wherein the first plurality of electrical devices is among the second plurality of electrical devices; and determine that a number of the second plurality of electrical devices exceeds a range of acceptable values.

4. The commissioning device of claim 1, wherein the commissioning device controller further comprises electrical device recognition software that allows the commissioning device controller to identify the one electrical device of the first plurality of electrical devices.

5. The commissioning device of claim 1, further comprising a user interface that is configured to receive the identifying information about the one electrical device of the first plurality of electrical devices.

6. The commissioning device of claim 5, wherein the user interface comprises a touchscreen.

7. The commissioning device of claim 1, wherein the first wireless communication technology is Bluetooth Low Energy, and wherein the second wireless communication technology is Wi-Fi.

8. The commissioning device of claim 1, wherein the one electrical device of the first plurality of electrical devices is within a line of sight of the location.

9. The commissioning device, of claim 1, wherein the commissioning device controller is further configured to:

determine that a second electrical device of the first plurality of electrical devices is located outside the zone of interest; and send an ungrouping signal to the local controller, wherein the ungrouping signal instructs the local controller to remove the second electrical device from a table maintained by the local controller, wherein the table comprises a list of the first plurality of electrical devices controlled by the local controller.

10. A method for commissioning a plurality of electrical devices, the method comprising:

broadcasting, using a first wireless communication technology by a transmitter from a location in a volume of space, a first query signal within a first broadcast range, wherein the first broadcast range covers a portion of a zone of interest within the volume of space;

receiving, using a second wireless communication technology by a receiver, a first confirmation signal from a local controller, wherein the first confirmation signal comprises an identification of each of a first plurality of electrical devices located within the first broadcast range that received the first query signal, and wherein the first plurality of electrical devices is a subset of a totality of electrical devices in a system;

determining that more than one electrical device of the plurality of electrical devices is located in the zone of interest in the volume of space; and reducing, at the transmitter, the first broadcast range of the first query signal to a second broadcast range and subsequently broadcasting a second query signal with the second broadcast range;

receiving, by the receiver using a second wireless communication technology, a second confirmation signal from a local controller, wherein the second confirmation signal comprises an identification of one of the first plurality of electrical devices located within the second broadcast range that received the second query signal, sending, using the transmitter, a verification signal to the local controller, wherein the verification signal comprises identifying information about the one electrical device of the first plurality of electrical devices.

11. The method of claim 10, wherein the local controller sends the first confirmation signal in response to receiving a plurality of identification signals from the first plurality of electrical devices, and wherein the plurality of identification signals confirms receipt of the first query signal by the first plurality of electrical devices.

12. The method of claim 10, further comprising:

broadcasting, before broadcasting the first query signal, a previous query signal using the first wireless communication technology by the transmitter from the location in the volume of space within a third broadcast range;

determining that no electrical devices received the previous query signal; and adjusting the third broadcast range to the broadcast range, wherein the third broadcast range is larger than the broadcast range.

13. The method of claim 10, further comprising:

sending, after receiving the second confirmation signal, an ungrouping signal to the local controller, wherein the ungrouping signal instructs the local controller to remove at least one of a remainder of the first plurality of electrical devices from a table maintained by the local controller.

14. The method of claim 10, wherein the query signal comprises instructions for each of the first plurality of electrical devices to send an identification signal to the local controller.

* * * * *